United States Patent
Kuo et al.

(10) Patent No.: US 9,712,712 B1
(45) Date of Patent: Jul. 18, 2017

(54) IN-SITU PRINTHEAD FOCUS ADJUSTMENT

(71) Applicant: Eastman Kodak Company, Rochester, NY (US)

(72) Inventors: Chung-Hui Kuo, Fairport, NY (US); Stacy M. Munechika, Fairport, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 0 days.

(21) Appl. No.: 15/151,715

(22) Filed: May 11, 2016

(51) Int. Cl.
| | |
|---|---|
| G03G 15/04 | (2006.01) |
| B41J 2/00 | (2006.01) |
| H04N 1/00 | (2006.01) |
| H04N 1/024 | (2006.01) |
| B41J 2/45 | (2006.01) |
| G03G 15/32 | (2006.01) |

(52) U.S. Cl.
CPC ............ *H04N 1/02409* (2013.01); *B41J 2/45* (2013.01); *G03G 15/04054* (2013.01); *G03G 15/326* (2013.01); *G03G 2215/0409* (2013.01)

(58) Field of Classification Search
CPC ....... G03G 15/04054; G03G 15/04063; G03G 15/326; G03G 2215/0407; G03G 2215/0409; G03G 2215/0412; H04N 1/02409; H04N 1/02845; H04N 1/02865; H04N 2201/02462; G03B 27/34; G02B 7/105; B41J 2/45; B41J 2/455
USPC .... 399/4, 118, 220; 347/130, 138, 149, 238, 347/242, 256, 257
See application file for complete search history.

(56) References Cited

U.S. PATENT DOCUMENTS

| | | | |
|---|---|---|---|
| 4,720,200 A | 1/1988 | Gomoll et al. | |
| 5,485,190 A | 1/1996 | Koetter et al. | |
| 5,568,320 A | 10/1996 | Rees et al. | |
| 8,356,868 B2 | 1/2013 | Miyata | |
| 9,081,322 B2 | 7/2015 | Herloski et al. | |
| 2008/0068439 A1* | 3/2008 | Koshimura | B41J 2/451 347/238 |
| 2009/0074464 A1* | 3/2009 | Yoshioka | G03G 15/04045 399/221 |

FOREIGN PATENT DOCUMENTS

| | | | | |
|---|---|---|---|---|
| JP | 62078961 A | * | 4/1987 | |
| JP | 05289190 A | * | 11/1993 | |
| JP | 05292545 A | * | 11/1993 | |
| KR | WO 2016039528 A1 | * | 3/2016 | ............ G03B 3/00 |

* cited by examiner

*Primary Examiner* — Robert Beatty
(74) *Attorney, Agent, or Firm* — Kevin E. Spaulding

(57) ABSTRACT

A method is described for adjusting the focus position of a linear printhead in a digital printing system. A line image is printed including a plurality of variable linewidth lines at different cross-track positions. A digital image capture system is used to capture an image of the printed line image, and a data processing system is used to automatically analyze the captured image to determine linewidth parameters representing linewidths of the plurality of lines. Linewidth progression functions are determined for the lines responsive to the determined linewidths, wherein the linewidth progression functions represent the linewidth parameters as a function of position. The linewidth progression functions are analyzed to determine defocus characteristics of the linear printhead, which are used to adjust the focus position of the linear printhead.

21 Claims, 20 Drawing Sheets

IN-SITU PRINTHEAD FOCUS ADJUSTMENT

CROSS-REFERENCE TO RELATED APPLICATIONS

Reference is made to commonly assigned, co-pending U.S. patent application Ser. No. 15/171,727, entitled: "Printhead focus adjustment mechanism including an eccentric pin", by M. Dobbertin et al., which is incorporated herein by reference.

FIELD OF THE INVENTION

This invention pertains to the field of digital printing and more particularly to a method for adjusting the focus of a printhead including a linear array of light sources.

BACKGROUND OF THE INVENTION

Electrophotography is a useful process for printing images on a receiver (or "imaging substrate"), such as a piece or sheet of paper or another planar medium (e.g., glass, fabric, metal, or other objects) as will be described below. In this process, an electrostatic latent image is formed on a photoreceptor by uniformly charging the photoreceptor and then discharging selected areas of the uniform charge to yield an electrostatic charge pattern corresponding to the desired image (i.e., a "latent image").

After the latent image is formed, charged toner particles are brought into the vicinity of the photoreceptor and are attracted to the latent image to develop the latent image into a toner image. Note that the toner image may not be visible to the naked eye depending on the composition of the toner particles (e.g., clear toner).

After the latent image is developed into a toner image on the photoreceptor, a suitable receiver is brought into juxtaposition with the toner image. A suitable electric field is applied to transfer the toner particles of the toner image to the receiver to form the desired print image on the receiver. The imaging process is typically repeated many times with reusable photoreceptors.

The receiver is then removed from its operative association with the photoreceptor and subjected to heat or pressure to permanently fix (i.e., "fuse") the print image to the receiver. Plural print images (e.g., separation images of different colors) can be overlaid on the receiver before fusing to form a multicolor print image on the receiver.

In a common type of printing system, the electrostatic latent image is formed by exposing the photoreceptor with a linear printhead including a linear array of light sources (e.g., LEDs). The printhead generally includes an array of lenslets which focus the light from the light sources onto the surface of the photoreceptor. The lenslets typically have a narrow depth of focus, which requires that the focus position of the printhead be adjusted to be within a very tight tolerance. Typically, a manual focus adjustment is performed in a specially designed fixture during the assembly of the linear printhead. However, this focusing adjustment does not account for variability in the mounting system for the linear printhead in the printing system. As a result, the focus position of the printhead may not be within acceptable tolerances. Because of the small spacing between the printhead and the photoreceptor, it is not practical to directly access the focus characteristics of the linear printhead after it has been installed the printing system. There remains a need for a simple and efficient method for accurately adjusting the focus position of the printhead after it has been mounted in the printing system.

SUMMARY OF THE INVENTION

The present invention represents a method for adjusting a focus position of a linear printhead in a digital printing system, wherein the linear printhead includes a linear array of light sources focused onto a photosensitive medium that moves past the linear printhead in an in-track direction, including:

a) providing digital image data for printing a plurality of printed lines at different cross-track positions, the printed lines extending in a length direction, wherein a linewidth of the printed lines varies along the length direction of the printed lines;

b) printing the digital image data using the digital printing system to provide a printed line image, wherein the printing includes activating the light sources in the linear printhead in accordance with the digital image data to provide an exposure pattern on the photosensitive medium, and wherein each line is printed using a corresponding portion of the linear printhead;

c) using a digital image capture system to capture an image of the printed line image;

d) using a data processing system to automatically analyze the captured image to determine linewidth parameters representing linewidths of the plurality of lines in the printed line image at a plurality of positions along the length direction;

e) determining linewidth progression functions for the plurality of lines in the printed line image responsive to the determined linewidths, wherein the linewidth progression functions represent the linewidth parameters as a function of position along the length direction;

f) analyzing the linewidth progression functions to determine defocus characteristics of the linear printhead; and g) adjusting the focus position of the linear printhead responsive to the determined defocus characteristics.

This invention has the advantage that it can be performed while the linear printhead is installed in the digital printing system.

It has the additional advantage that it does not require the use of costly high-precision gauges.

It has the further advantage that the method can be used in the field to adjust the focus of the printhead at a customer site without the need for special fixtures.

BRIEF DESCRIPTION OF THE DRAWINGS

It is to be understood that the attached drawings are for purposes of illustrating the concepts of the invention and may not be to scale. Identical reference numerals have been used, where possible, to designate identical features that are common to the figures.

DETAILED DESCRIPTION OF THE INVENTION

Figure 1:
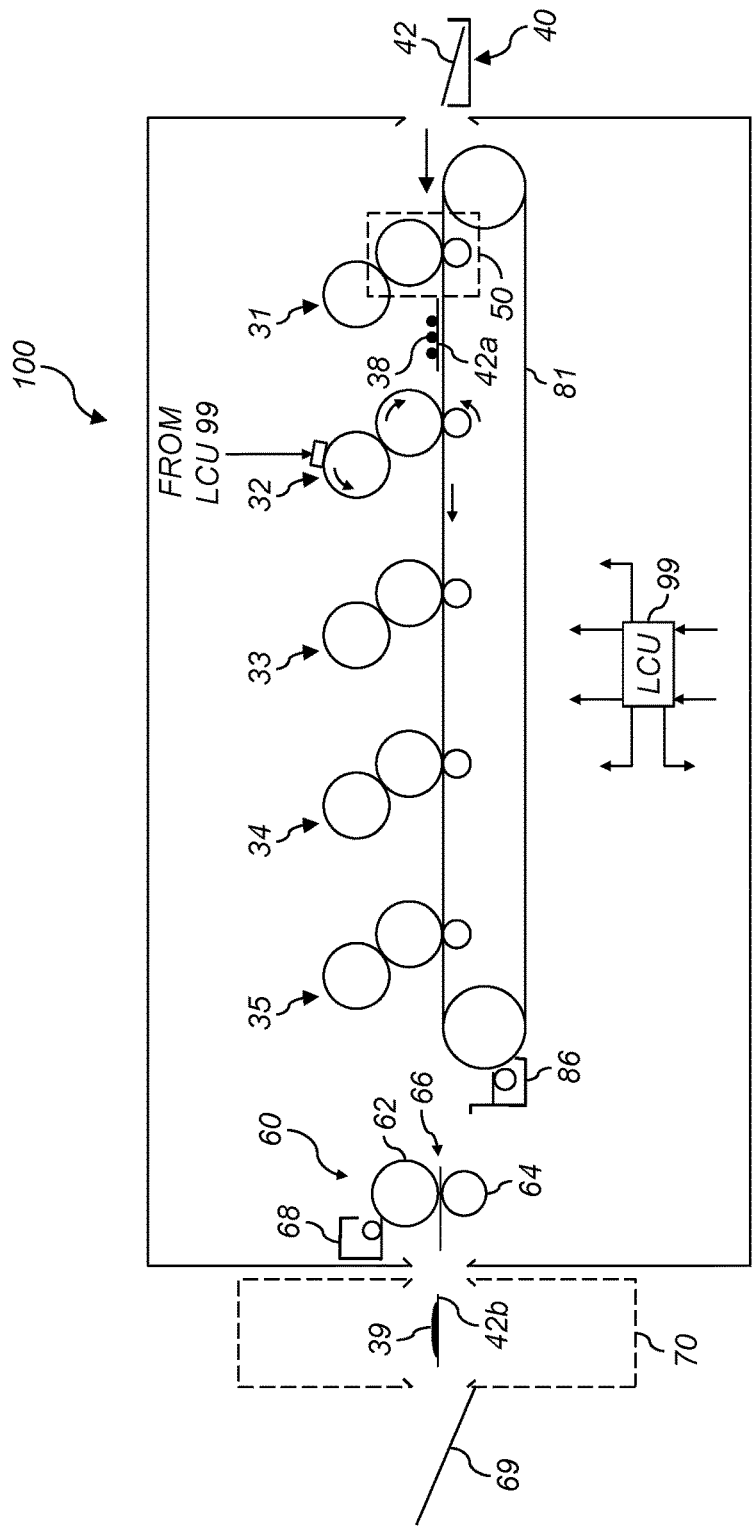
FIG. 1 is an elevational cross-section of an electrophotographic printer suitable for use with various embodiments.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated, or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

As used herein, "sheet" is a discrete piece of media, such as receiver media for an electrophotographic printer (described below). Sheets have a length and a width. Sheets are folded along fold axes (e.g., positioned in the center of the sheet in the length dimension, and extending the full width of the sheet). The folded sheet contains two "leaves," each leaf being that portion of the sheet on one side of the fold axis. The two sides of each leaf are referred to as "pages." "Face" refers to one side of the sheet, whether before or after folding.

As used herein, "toner particles" are particles of one or more material(s) that are transferred by an electrophotographic (EP) printer to a receiver to produce a desired effect or structure (e.g., a print image, texture, pattern, or coating) on the receiver. Toner particles can be ground from larger solids, or chemically prepared (e.g., precipitated from a solution of a pigment and a dispersant using an organic solvent), as is known in the art. Toner particles can have a range of diameters (e.g., less than 8 on the order of 10-15 µm, up to approximately 30 µm, or larger), where "diameter" preferably refers to the volume-weighted median diameter, as determined by a device such as a Coulter Multisizer. When practicing this invention, it is preferable to use larger toner particles (i.e., those having diameters of at least 20 µm) in order to obtain the desirable toner stack heights that would enable macroscopic toner relief structures to be formed.

"Toner" refers to a material or mixture that contains toner particles, and that can be used to form an image, pattern, or coating when deposited on an imaging member including a photoreceptor, a photoconductor, or an electrostatically-charged or magnetic surface. Toner can be transferred from the imaging member to a receiver. Toner is also referred to in the art as marking particles, dry ink, or developer, but note that herein "developer" is used differently, as described below. Toner can be a dry mixture of particles or a suspension of particles in a liquid toner base.

As mentioned already, toner includes toner particles; it can also include other types of particles. The particles in toner can be of various types and have various properties. Such properties can include absorption of incident electromagnetic radiation (e.g., particles containing colorants such as dyes or pigments), absorption of moisture or gasses (e.g., desiccants or getters), suppression of bacterial growth (e.g., biocides, particularly useful in liquid-toner systems), adhesion to the receiver (e.g., binders), electrical conductivity or low magnetic reluctance (e.g., metal particles), electrical resistivity, texture, gloss, magnetic remanence, florescence, resistance to etchants, and other properties of additives known in the art.

In single-component or mono-component development systems, "developer" refers to toner alone. In these systems, none, some, or all of the particles in the toner can themselves be magnetic. However, developer in a mono-component system does not include magnetic carrier particles. In dual-component, two-component, or multi-component development systems, "developer" refers to a mixture including toner particles and magnetic carrier particles, which can be electrically-conductive or -non-conductive. Toner particles can be magnetic or non-magnetic. The carrier particles can be larger than the toner particles (e.g., 15-20 µm or 20-300 µm in diameter). A magnetic field is used to move the developer in these systems by exerting a force on the magnetic carrier particles. The developer is moved into proximity with an imaging member or transfer member by the magnetic field, and the toner or toner particles in the developer are transferred from the developer to the member by an electric field, as will be described further below. The magnetic carrier particles are not intentionally deposited on the member by action of the electric field; only the toner is intentionally deposited. However, magnetic carrier particles, and other particles in the toner or developer, can be unintentionally transferred to an imaging member. Developer can include other additives known in the art, such as those listed above for toner. Toner and carrier particles can be substantially spherical or non-spherical.

The electrophotographic process can be embodied in devices including printers, copiers, scanners, and facsimiles, and analog or digital devices, all of which are referred to herein as "printers." Various embodiments described herein are useful with electrostatographic printers such as electrophotographic printers that employ toner developed on an electrophotographic receiver, and ionographic printers and copiers that do not rely upon an electrophotographic receiver. Electrophotography and ionography are types of electrostatography (printing using electrostatic fields), which is a subset of electrography (printing using electric fields). The present invention can be practiced using any type of electrographic printing system, including electrophotographic and ionographic printers.

A digital reproduction printing system ("printer") typically includes a digital front-end processor (DFE), a print engine (also referred to in the art as a "marking engine") for applying toner to the receiver, and one or more post-printing finishing system(s) (e.g., a UV coating system, a glosser system, or a laminator system). A printer can reproduce pleasing black-and-white or color images onto a receiver. A printer can also produce selected patterns of toner on a receiver, which patterns (e.g., surface textures) do not correspond directly to a visible image.

The DFE receives input electronic files (such as Postscript command files) composed of images from other input devices (e.g., a scanner, a digital camera or a computer-generated image processor). Within the context of the present invention, images can include photographic renditions of scenes, as well as other types of visual content such as text or graphical elements. Images can also include invisible content such as specifications of texture, gloss or protective coating patterns.

The DFE can include various function processors, such as a raster image processor (RIP), image positioning processor, image manipulation processor, color processor, or image storage processor. The DFE rasterizes input electronic files into image bitmaps for the print engine to print. In some embodiments, the DFE permits a human operator to set up parameters such as layout, font, color, paper type, or post-finishing options. The print engine takes the rasterized image bitmap from the DFE and renders the bitmap into a form that can control the printing process from the exposure device to transferring the print image onto the receiver. The finishing system applies features such as protection, glossing, or binding to the prints. The finishing system can be implemented as an integral component of a printer, or as a separate machine through which prints are fed after they are printed.

The printer can also include a color management system that accounts for characteristics of the image printing process implemented in the print engine (e.g., the electrophotographic process) to provide known, consistent color reproduction characteristics. The color management system can also provide known color reproduction for different inputs (e.g., digital camera images or film images). Color management systems are well-known in the art, and any such system can be used to provide color corrections in accordance with the present invention.

In an embodiment of an electrophotographic modular printing machine useful with various embodiments (e.g., the NEXPRESS SX 3900 printer manufactured by Eastman Kodak Company of Rochester, N.Y.) color-toner print images are made in a plurality of color imaging modules arranged in tandem, and the print images are successively electrostatically transferred to a receiver adhered to a transport web moving through the modules. Colored toners include colorants, (e.g., dyes or pigments) which absorb specific wavelengths of visible light. Commercial machines of this type typically employ intermediate transfer members in the respective modules for transferring visible images from the photoreceptor and transferring print images to the receiver. In other electrophotographic printers, each visible image is directly transferred to a receiver to form the corresponding print image.

Electrophotographic printers having the capability to also deposit clear toner using an additional imaging module are also known. The provision of a clear-toner overcoat to a color print is desirable for providing features such as protecting the print from fingerprints, reducing certain visual artifacts or providing desired texture or surface finish characteristics. Clear toner uses particles that are similar to the toner particles of the color development stations but without colored material (e.g., dye or pigment) incorporated into the toner particles. However, a clear-toner overcoat can add cost and reduce color gamut of the print; thus, it is desirable to provide for operator/user selection to determine whether or not a clear-toner overcoat will be applied to the entire print. A uniform layer of clear toner can be provided. A layer that varies inversely according to heights of the toner stacks can also be used to establish level toner stack heights. The respective color toners are deposited one upon the other at respective locations on the receiver and the height of a respective color toner stack is the sum of the toner heights of each respective color. Uniform stack height provides the print with a more even or uniform gloss.

Figure 2:
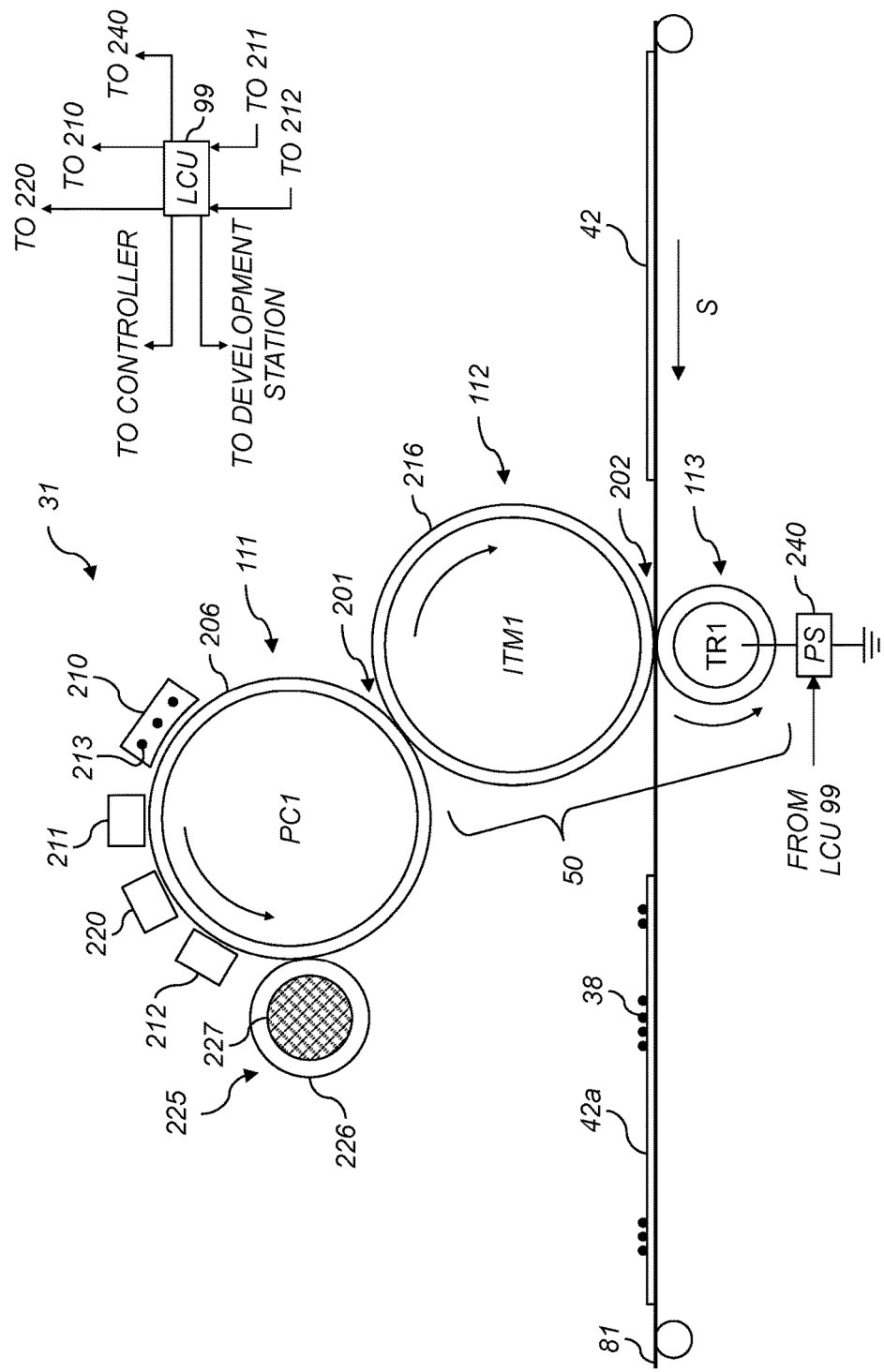
FIG. 2 is an elevational cross-section of one printing module of the electrophotographic printer of FIG. 1.

FIGS. 1-2 are elevational cross-sections showing portions of a typical electrophotographic printer 100 useful with various embodiments. Printer 100 is adapted to produce images, such as single-color images (i.e., monochrome images), or multicolor images such as CMYK, or pentachrome (five-color) images, on a receiver. Multicolor images are also known as "multi-component" images. One embodiment involves printing using an electrophotographic print engine having five sets of single-color image-producing or image-printing stations or modules arranged in tandem, but more or less than five colors can be combined on a single receiver. Other electrophotographic writers or printer apparatus can also be included. Various components of printer 100 are shown as rollers; other configurations are also possible, including belts.

Referring to FIG. 1, printer 100 is an electrophotographic printing apparatus having a number of tandemly-arranged electrophotographic image-forming printing modules 31, 32, 33, 34, 35, also known as electrophotographic imaging subsystems. Each printing module 31, 32, 33, 34, 35 produces a single-color toner image for transfer using a respective transfer subsystem 50 (for clarity, only one is labeled) to a receiver 42 successively moved through the modules. In some embodiments one or more of the printing module 31, 32, 33, 34, 35 can print a colorless toner image, which can be used to provide a protective overcoat or tactile image features. Receiver 42 is transported from supply unit 40, which can include active feeding subsystems as known in the art, into printer 100 using a transport web 81. In various embodiments, the visible image can be transferred directly from an imaging roller to a receiver, or from an imaging roller to one or more transfer roller(s) or belt(s) in sequence in transfer subsystem 50, and then to receiver 42. Receiver 42 is, for example, a selected section of a web or a cut sheet of a planar receiver media such as paper or transparency film.

In the illustrated embodiments, each receiver 42 can have up to five single-color toner images transferred in registration thereon during a single pass through the five printing modules 31, 32, 33, 34, 35 to form a pentachrome image. As used herein, the term "pentachrome" implies that in a print image, combinations of various of the five colors are combined to form other colors on the receiver at various locations on the receiver, and that all five colors participate to form process colors in at least some of the subsets. That is, each of the five colors of toner can be combined with toner of one or more of the other colors at a particular location on the receiver to form a color different than the colors of the toners combined at that location. In an exemplary embodiment, printing module 31 forms black (K) print images, printing module 32 forms yellow (Y) print images, printing module 33 forms magenta (M) print images, and printing module 34 forms cyan (C) print images.

Printing module 35 can form a red, blue, green, or other fifth print image, including an image formed from a clear toner (e.g., one lacking pigment). The four subtractive primary colors, cyan, magenta, yellow, and black, can be combined in various combinations of subsets thereof to form a representative spectrum of colors. The color gamut of a printer (i.e., the range of colors that can be produced by the printer) is dependent upon the materials used and the process used for forming the colors. The fifth color can therefore be added to improve the color gamut. In addition to adding to the color gamut, the fifth color can also be a specialty color toner or spot color, such as for making proprietary logos or colors that cannot be produced with only CMYK colors (e.g., metallic, fluorescent, or pearlescent colors), or a clear toner or tinted toner. Tinted toners absorb less light than they transmit, but do contain pigments or dyes that move the hue of light passing through them towards the hue of the tint. For example, a blue-tinted toner coated on white paper will cause the white paper to appear light blue when viewed under white light, and will cause yellows printed under the blue-tinted toner to appear slightly greenish under white light.

Receiver 42a is shown after passing through printing module 31. Print image 38 on receiver 42a includes unfused toner particles. Subsequent to transfer of the respective print images, overlaid in registration, one from each of the respective printing modules 31, 32, 33, 34, 35, receiver 42a is advanced to a fuser module 60 (i.e., a fusing or fixing assembly) to fuse the print image 38 to the receiver 42a. Transport web 81 transports the print-image-carrying receivers to the fuser module 60, which fixes the toner particles to the respective receivers, generally by the application of heat and pressure. The receivers are serially de-tacked from the transport web 81 to permit them to feed cleanly into the fuser module 60. The transport web 81 is then reconditioned for reuse at cleaning station 86 by cleaning and neutralizing the charges on the opposed surfaces of the transport web 81. A mechanical cleaning station (not shown) for scraping or vacuuming toner off transport web 81 can also be used independently or with cleaning station 86. The mechanical cleaning station can be disposed along the transport web 81 before or after cleaning station 86 in the direction of rotation of transport web 81.

In the illustrated embodiment, the fuser module 60 includes a heated fusing roller 62 and an opposing pressure roller 64 that form a fusing nip 66 therebetween. In an embodiment, fuser module 60 also includes a release fluid application substation 68 that applies release fluid, e.g., silicone oil, to fusing roller 62. Alternatively, wax-containing toner can be used without applying release fluid to the fusing roller 62. Other embodiments of fusers, both contact and non-contact, can be employed. For example, solvent fixing uses solvents to soften the toner particles so they bond with the receiver. Photoflash fusing uses short bursts of high-frequency electromagnetic radiation (e.g., ultraviolet light) to melt the toner. Radiant fixing uses lower-frequency electromagnetic radiation (e.g., infrared light) to more slowly melt the toner. Microwave fixing uses electromagnetic radiation in the microwave range to heat the receivers (primarily), thereby causing the toner particles to melt by heat conduction, so that the toner is fixed to the receiver.

The fused receivers (e.g., receiver 42b carrying fused image 39) are transported in series from the fuser module 60 along a path either to an output tray 69, or back to printing modules 31, 32, 33, 34, 35 to form an image on the backside of the receiver (i.e., to form a duplex print). Receivers 42b can also be transported to any suitable output accessory. For example, an auxiliary fuser or glossing assembly can provide a clear-toner overcoat. Printer 100 can also include multiple fuser modules 60 to support applications such as overprinting, as known in the art.

In various embodiments, between the fuser module 60 and the output tray 69, receiver 42b passes through a finisher 70. Finisher 70 performs various paper-handling operations, such as folding, stapling, saddle-stitching, collating, and binding.

Printer 100 includes main printer apparatus logic and control unit (LCU) 99, which receives input signals from various sensors associated with printer 100 and sends control signals to various components of printer 100. LCU 99 can include a microprocessor incorporating suitable look-up tables and control software executable by the LCU 99. It can also include a field-programmable gate array (FPGA), programmable logic device (PLD), programmable logic controller (PLC) (with a program in, e.g., ladder logic), microcontroller, or other digital control system. LCU 99 can include memory for storing control software and data. In some embodiments, sensors associated with the fuser module 60 provide appropriate signals to the LCU 99. In response to the sensor signals, the LCU 99 issues command and control signals that adjust the heat or pressure within fusing nip 66 and other operating parameters of fuser module 60. This permits printer 100 to print on receivers of various thicknesses and surface finishes, such as glossy or matte.

Image data for printing by printer 100 can be processed by a raster image processor (RIP; not shown), which can include a color separation screen generator or generators. The output of the RIP can be stored in frame or line buffers for transmission of the color separation print data to each of a set of respective LED writers associated with the printing modules 31, 32, 33, 34, 35 (e.g., for black (K), yellow (Y), magenta (M), cyan (C), and red (R) color channels, respectively). The RIP or color separation screen generator can be a part of printer 100 or remote therefrom. Image data processed by the RIP can be obtained from a color document scanner or a digital camera or produced by a computer or from a memory or network which typically includes image data representing a continuous image that needs to be reprocessed into halftone image data in order to be adequately represented by the printer. The RIP can perform image processing processes (e.g., color correction) in order to obtain the desired color print. Color image data is separated into the respective colors and converted by the RIP to halftone dot image data in the respective color (for example, using halftone matrices, which provide desired screen angles and screen rulings). The RIP can be a suitably-programmed computer or logic device and is adapted to employ stored or computed halftone matrices and templates for processing separated color image data into rendered image data in the form of halftone information suitable for printing. These halftone matrices can be stored in a screen pattern memory.

FIG. 2 shows additional details of printing module 31, which is representative of printing modules 32, 33, 34, and 35 (FIG. 1). Photoreceptor 206 of imaging member 111 includes a photoconductive layer formed on an electrically conductive substrate. The photoconductive layer is an insulator in the substantial absence of light so that electric charges are retained on its surface. Upon exposure to light, the charge is dissipated. In various embodiments, photoreceptor 206 is part of, or disposed over, the surface of imaging member 111, which can be a plate, drum, or belt. Photoreceptors can include a homogeneous layer of a single material such as vitreous selenium or a composite layer containing a photoconductor and another material. Photoreceptors 206 can also contain multiple layers.

Charging subsystem 210 applies a uniform electrostatic charge to photoreceptor 206 of imaging member 111. In an exemplary embodiment, charging subsystem 210 includes a wire grid 213 having a selected voltage. Additional necessary components provided for control can be assembled about the various process elements of the respective printing modules. Meter 211 measures the uniform electrostatic charge provided by charging subsystem 210.

An exposure subsystem 220 is provided for selectively modulating the uniform electrostatic charge on photoreceptor 206 in an image-wise fashion by exposing photoreceptor 206 to electromagnetic radiation to form a latent electrostatic image. The uniformly-charged photoreceptor 206 is typically exposed to actinic radiation provided by selectively activating particular light sources in an LED array or a laser device outputting light directed onto photoreceptor 206. In embodiments using laser devices, a rotating polygon (not shown) is sometimes used to scan one or more laser beam(s) across the photoreceptor in the fast-scan direction. One pixel site is exposed at a time, and the intensity or duty cycle of the laser beam is varied at each dot site. In embodiments using an LED array, the array can include a plurality of LEDs arranged next to each other in a line, all dot sites in one row of dot sites on the photoreceptor can be selectively exposed simultaneously, and the intensity or duty cycle of each LED can be varied within a line exposure time to expose each pixel site in the row during that line exposure time.

As used herein, an "engine pixel" is the smallest addressable unit on photoreceptor 206 which the exposure subsystem 220 (e.g., the laser or the LED) can expose with a selected exposure different from the exposure of another engine pixel. Engine pixels can overlap (e.g., to increase addressability in the slow-scan direction). Each engine pixel has a corresponding engine pixel location, and the exposure applied to the engine pixel location is described by an engine pixel level.

The exposure subsystem 220 can be a write-white or write-black system. In a write-white or "charged-area-development" system, the exposure dissipates charge on areas of photoreceptor 206 to which toner should not adhere. Toner particles are charged to be attracted to the charge remaining on photoreceptor 206. The exposed areas therefore correspond to white areas of a printed page. In a write-black or "discharged-area development" system, the toner is charged to be attracted to a bias voltage applied to photoreceptor 206 and repelled from the charge on photoreceptor 206. Therefore, toner adheres to areas where the charge on photoreceptor 206 has been dissipated by exposure. The exposed areas therefore correspond to black areas of a printed page.

In the illustrated embodiment, meter 212 is provided to measure the post-exposure surface potential within a patch area of a latent image formed from time to time in a non-image area on photoreceptor 206. Other meters and components can also be included (not shown).

A development station 225 includes toning shell 226, which can be rotating or stationary, for applying toner of a selected color to the latent image on photoreceptor 206 to produce a developed image on photoreceptor 206 corresponding to the color of toner deposited at this printing module 31. Development station 225 is electrically biased by a suitable respective voltage to develop the respective latent image, which voltage can be supplied by a power supply (not shown). Developer is provided to toning shell 226 by a supply system (not shown) such as a supply roller, auger, or belt. Toner is transferred by electrostatic forces from development station 225 to photoreceptor 206. These forces can include Coulombic forces between charged toner particles and the charged electrostatic latent image, and Lorentz forces on the charged toner particles due to the electric field produced by the bias voltages.

In some embodiments, the development station 225 employs a two-component developer that includes toner particles and magnetic carrier particles. The exemplary development station 225 includes a magnetic core 227 to cause the magnetic carrier particles near toning shell 226 to form a "magnetic brush," as known in the electrophotographic art. Magnetic core 227 can be stationary or rotating, and can rotate with a speed and direction the same as or different than the speed and direction of toning shell 226. Magnetic core 227 can be cylindrical or non-cylindrical, and can include a single magnet or a plurality of magnets or magnetic poles disposed around the circumference of magnetic core 227. Alternatively, magnetic core 227 can include an array of solenoids driven to provide a magnetic field of alternating direction. Magnetic core 227 preferably provides a magnetic field of varying magnitude and direction around the outer circumference of toning shell 226. Development station 225 can also employ a mono-component developer comprising toner, either magnetic or non-magnetic, without separate magnetic carrier particles.

Transfer subsystem 50 includes transfer backup member 113, and intermediate transfer member 112 for transferring the respective print image from photoreceptor 206 of imaging member 111 through a first transfer nip 201 to surface 216 of intermediate transfer member 112, and thence to a receiver 42 which receives respective toned print images 38 from each printing module in superposition to form a composite image thereon. The print image 38 is, for example, a separation of one color, such as cyan. Receiver 42 is transported by transport web 81. Transfer to a receiver is effected by an electrical field provided to transfer backup member 113 by power source 240, which is controlled by LCU 99. Receiver 42 can be any object or surface onto which toner can be transferred from imaging member 111 by application of the electric field. In this example, receiver 42 is shown prior to entry into a second transfer nip 202, and receiver 42a is shown subsequent to transfer of the print image 38 onto receiver 42a.

In the illustrated embodiment, the toner image is transferred from the photoreceptor 206 to the intermediate transfer member 112, and from there to the receiver 42. Registration of the separate toner images is achieved by registering the separate toner images on the receiver 42, as is done with the NEXPRESS SX 3900. In some embodiments, a single transfer member is used to sequentially transfer toner images from each color channel to the receiver 42. In other embodiments, the separate toner images can be transferred in register directly from the photoreceptor 206 in the respective printing module 31, 32, 33, 34, 25 to the receiver 42 without using a transfer member. Either transfer process is suitable when practicing this invention. An alternative method of transferring toner images involves transferring the separate toner images, in register, to a transfer member and then transferring the registered image to a receiver.

LCU 99 sends control signals to the charging subsystem 210, the exposure subsystem 220, and the respective development station 225 of each printing module 31, 32, 33, 34, 35 (FIG. 1), among other components. Each printing module can also have its own respective controller (not shown) coupled to LCU 99.

Figure 3:
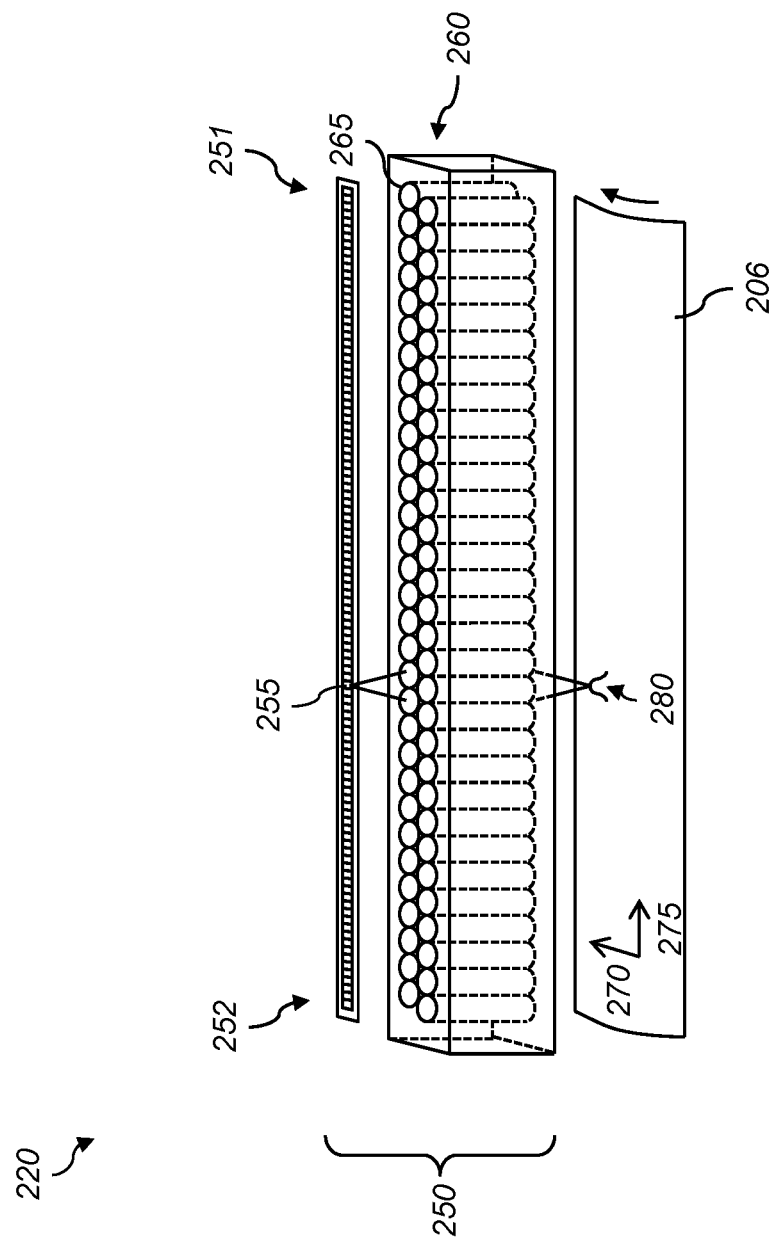
FIG. 3 illustrates an exemplary linear printhead including a linear array of light sources.

FIG. 3 shows an exemplary exposure subsystem 220 that includes a linear printhead 250 having a linear array of individually controllable light sources 255. In an exemplary configuration the light sources 255 are LED light sources, although other types of light sources such as diode laser light sources could also be used in accordance with the invention.

A lenslet array 260 having an array of lenslets 265 is used to focus light from the light sources 255 onto photoreceptor 206, forming a corresponding array of exposure spots 280. In an exemplary arrangement, the lenslets 265 are gradient-index lenses. Lenslet arrays 260 formed using arrays of gradient-index lenses are commonly known as "SELFOC lens arrays." In the illustrated configuration, the lenslet array 260 includes two rows of lenslets 265 arranged in a hexagonal packing arrangement. However, it will be obvious to those skilled in the art that other arrangements can also be used.

In the illustrated arrangement, the photoreceptor 206 is a photosensitive medium provided on the cylindrical surface of the imaging member 111 (FIG. 2). As the imaging member 111 rotates, the photoreceptor 206 moves past the exposure subsystem 220 in an in-track direction 270. The linear printhead 250 spans the photoreceptor 206 in a cross-track direction 275 from a first end 251 to a second end 252.

The terminology that "the photoreceptor 206 moves past the exposure subsystem 220" does not necessarily imply that the photosensitive medium is the element that moves but rather implies that the photosensitive medium and the linear printhead 250 are moved relative to each other. In some arrangements, rather than the photosensitive medium being moved past the linear printhead 250, the photosensitive medium could be held in a fixed position and the linear printhead 250 could be moved past the photosensitive medium in the in-track direction 270.

Figure 4:
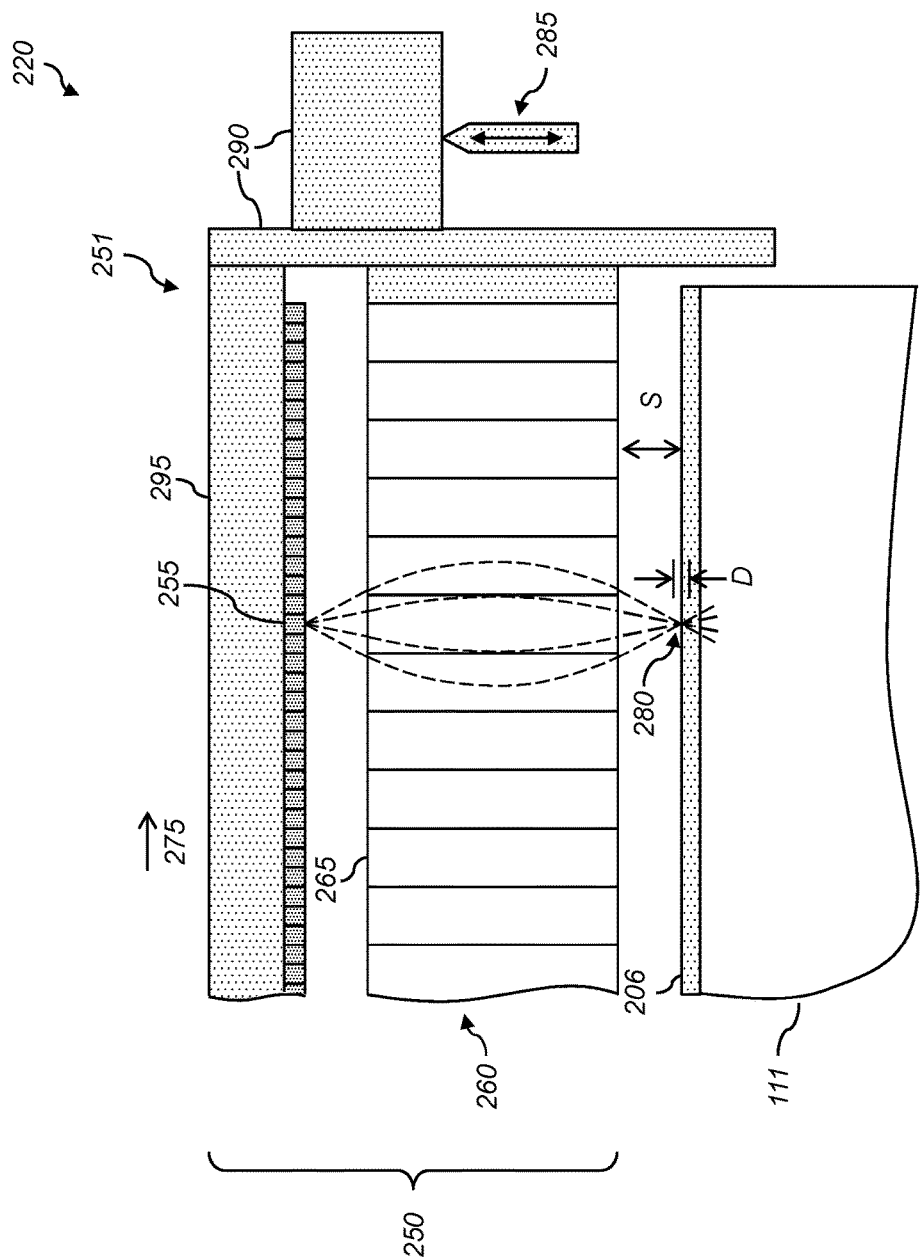
FIG. 4 shows additional details for the linear printhead of FIG. 3.

FIG. 4 shows additional details of the linear printhead 250. To achieve good performance, it is important that the light from the light sources 255 be accurately focused onto the photoreceptor 206 to within a depth of focus D. The depth of focus D in typical linear printheads 250 is generally about 20-50 µm. In an exemplary configuration, focus adjustment mechanisms 285 are provided at both the first end 251 and the second end 252 (FIG. 3) of the linear printhead 250, which enables the spacing S between the linear printhead 250 and the photoreceptor 206 to be adjusted. Other adjustment mechanisms can also be provided to adjust other geometrical parameters such as skew between the linear printhead and the axis of the imaging member.

In the exemplary configuration of FIG. 4, the array of light sources 255 is mounted on a heat sink 295. The lenslet array 260 and the heat sink 295 are mounted to a frame 290 to provide the linear printhead 250, with the lenslet array 260 being spaced at a specified distance from the light sources 255. The focus adjustment mechanism 285 is configured to move the ends of the linear printhead 250 toward or away from the photoreceptor 206, thereby controlling the spacing S and adjusting the focus position. Any appropriate focus adjustment mechanism 285 known in the art can be used in accordance with the present invention. In some arrangements, the focus adjustment mechanism 285 can include an adjustment screw, upon which the frame 290 of the linear printhead 250 rests. The adjustment screw can then be turned, either manually or with a computer controlled motor (e.g., a stepper motor), to adjust the spacing S. In other arrangements, the focus adjustment mechanism 285 can include a rotatable cam or eccentric pin upon which the frame 290 of the linear printhead 250 rests. For cases where the focus adjustment mechanism 285 is manually operated, a knob or any other type of manual control mechanism known in the art can be provided which a human operator can use to adjust the focus position. In such configurations, a scale or some other type of feedback can be provided to enable the user to quantify the amount of adjustment that is being made.

Figure 17B:
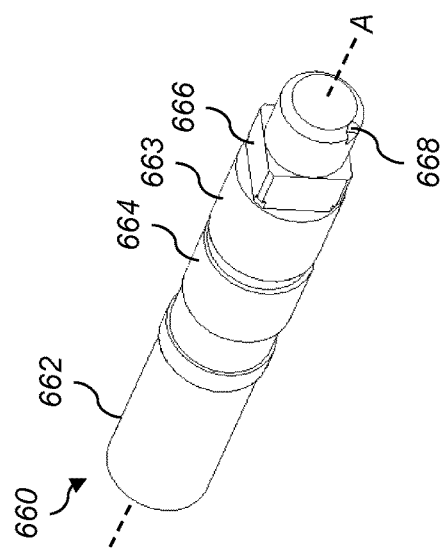
FIG. 17B illustrates further details of the eccentric pin in the focus adjustment mechanism of FIG. 17A.
Figure 17A:
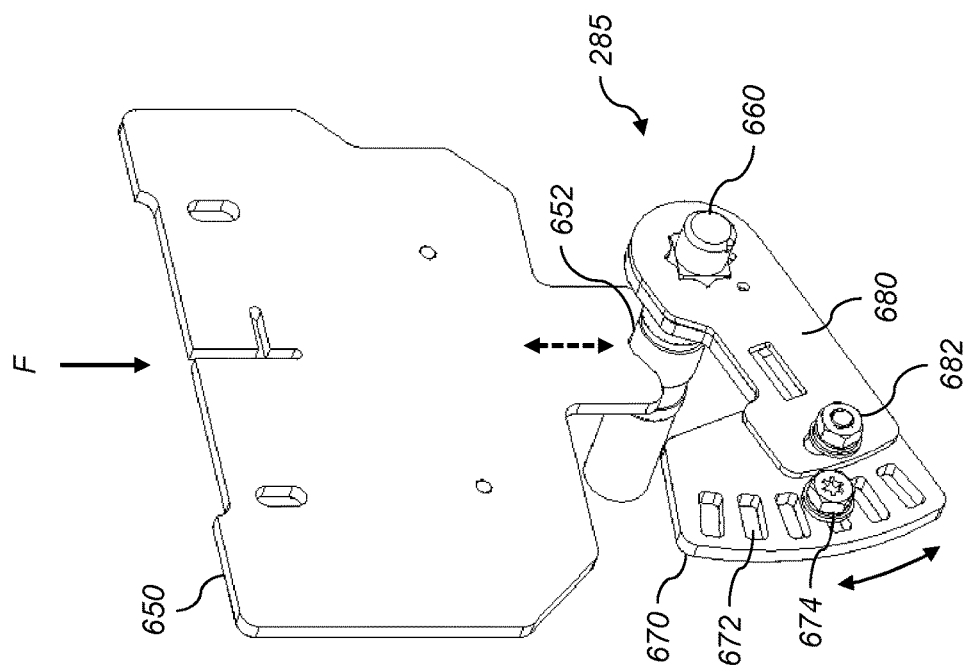
FIG. 17A illustrates components of an exemplary focus adjustment mechanism using an eccentric pin.

One exemplary focus adjustment mechanism 285 that can be used in accordance with the present invention is illustrated in FIGS. 17A-17E. As shown in FIG. 17A, the focus adjustment mechanism 285 includes an eccentric pin 660, together with an adjustment plate 670 and an anti-backlash plate 680 that are used to adjust the orientation of the eccentric pin 660. A plate 650, which is a part of the frame 290 (FIG. 4) of the linear printhead 250 (FIG. 4), has a v-shaped notch 652 which rests on the eccentric pin 660. In other configurations, the plate 650 may have a flat surface which rests on the eccentric pin 660, or can take other shapes. As the eccentric pin 660 is rotated, the plate 650 is raised or lowered in accordance with the eccentricity of the eccentric pin 660. A force mechanism (not shown) provides a force F which holds the plate 650 of the linear printhead 250 firmly against the eccentric pin 660. Any appropriate force mechanism known in the art can be used. In an exemplary configuration, the force mechanism is a clamp mechanism which is attached to a feature on the linear printhead 250. In other configurations, the force mechanism can include a spring adapted to provide the force F.

The focus adjustment mechanism 285 of FIG. 17A is located at one end 251 of the linear printhead 250 (FIG. 3). A second focus adjustment mechanism 285 will generally be located at the other end 252 of the linear printhead. In other embodiments, the focus adjustment mechanism 285 can be positioned in other positions along the length of the linear printhead 250.

FIG. 17B illustrates additional details of the eccentric pin 660. The eccentric pin 660 includes two axial portions 662, 663, which are aligned with an axis A of the axial pin 662. In an exemplary configuration, the axial portion 662 fits into a circular hole in a support structure (not shown) that supports the imaging member 111 (FIG. 2), and the axial portion 663 fits in a circular hole through a plate 690 (see FIG. 17E), which is part of the support structure. The eccentric pin 660 can be rotated with the axial portions 662, 663 turning within their respective holes.

The eccentric pin 660 also includes an eccentric ring 664 having an axis which is offset from the pin axis A. Eccentric rings represent one particular type of cam having a circular shape and an offset axis. Within the context of this invention cams are features having a surface whose radial distance from the pin axis A varies around the perimeter of the cam. It will be obvious to one skilled in the art that different cam shapes could also be used in accordance with the present invention. In an exemplary configuration, the eccentric ring 664 has a circular shape with a diameter of 12.0 mm and an axis which is offset by 225 µm relative to the axis A. This configuration enables the plate to be raised or lowered by ±225 μm as the eccentric pin 660 is rotated through a range of 180°. As the eccentric pin 660 is rotated, the frame 290 of the linear printhead 250 (FIG. 4) rides on the surface of the eccentric ring 664. This adjusts the focus position of the linear printhead 250 by adjusting a distance between the linear printhead 250 and the pin axis A, which is in a fixed position relative to the imaging member 111 (FIG. 2).

The eccentric pin 660 also includes gripping feature 666 which engages with a complementary gripping feature 678 (see FIG. 17C) of the adjustment plate 670. In the illustrated configuration, the gripping feature 666 of the eccentric pin 660 is a 4-pointed feature having a square shape, and the gripping feature 678 of the adjustment plate 670 is an 8-pointed feature having a star shape. In other configurations, the gripping feature 666 can have the shape of other regular polygons (e.g., a hexagonal shape similar to a standard nut) and the gripping feature 678 can have a corresponding multi-pointed star shape (e.g., a 12 point star shape similar to a standard socket). In general, the gripping features 666, 678 can take any appropriate shape in which the gripping features 678 of the adjustment plate 670 engage with the gripping features 666 of the eccentric pin 660. For example, but of the gripping features 666, 678 can take a 12 point star shape.

Note that the "square shape" of the gripping feature 666 on the eccentric pin 660 in FIG. 17B is not a perfect square, but includes rounded corners having a defined radii. Within the context of the present invention a "substantially square cross-section" is any cross-section having four equal flat sides forming equal interior angles (i.e., 90°) with the adjacent sides. The four flat sides may join at corners having a variety of shapes including sharp corners, rounded corners, beveled corners, and the like. (Note that the sides and angles may be slightly unequal due to manufacturing tolerances.) Similarly, a "polygon-shaped cross-section" is any cross-section having a plurality of flat sides arranged at specified angles relative to each other. Typically, the polygon-shaped cross-section will be a regular polygon having N equal sides with equal interior angles. Similarly, the multi-pointed star shape can have rounded corners for one or both of the interior and exterior corners.

The gripping feature 678 of the adjustment plate 670 can fit over the gripping feature 666 of the eccentric pin 660 at a series of different angular orientations (i.e., every 45° in the illustrated configuration) to provide a coarse adjustment on the orientation of the eccentric pin 660. A fiducial 668 on the eccentric pin 660 can be aligned with a fiducial 684 on the anti-backlash plate 680 (see FIG. 17C) to define a nominal orientation.

Figure 17D:
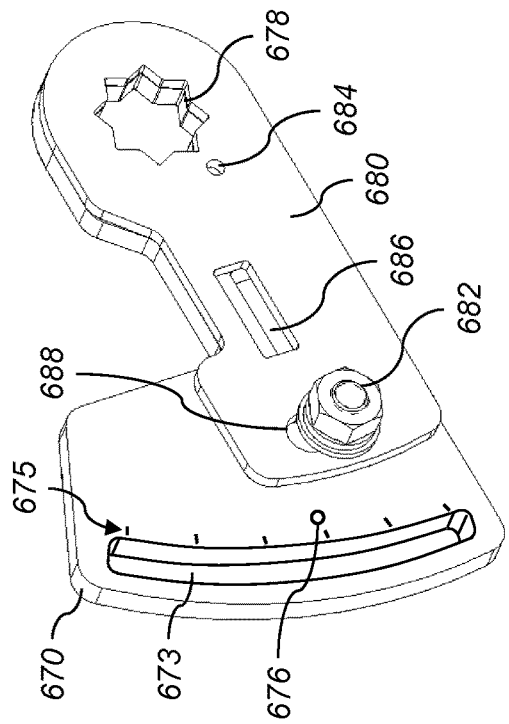
FIG. 17D illustrates an alternate adjustment plate configuration.
Figure 17C:
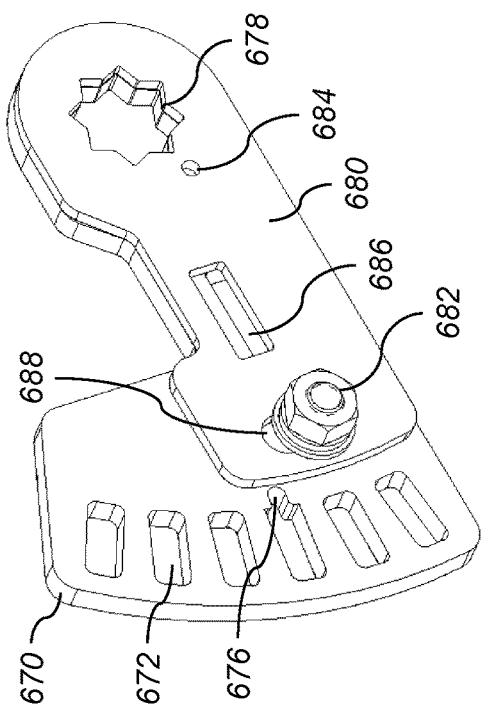
FIG. 17C illustrates further details of the adjustment plate in the focus adjustment mechanism of FIG. 17A.
Figure 17E:
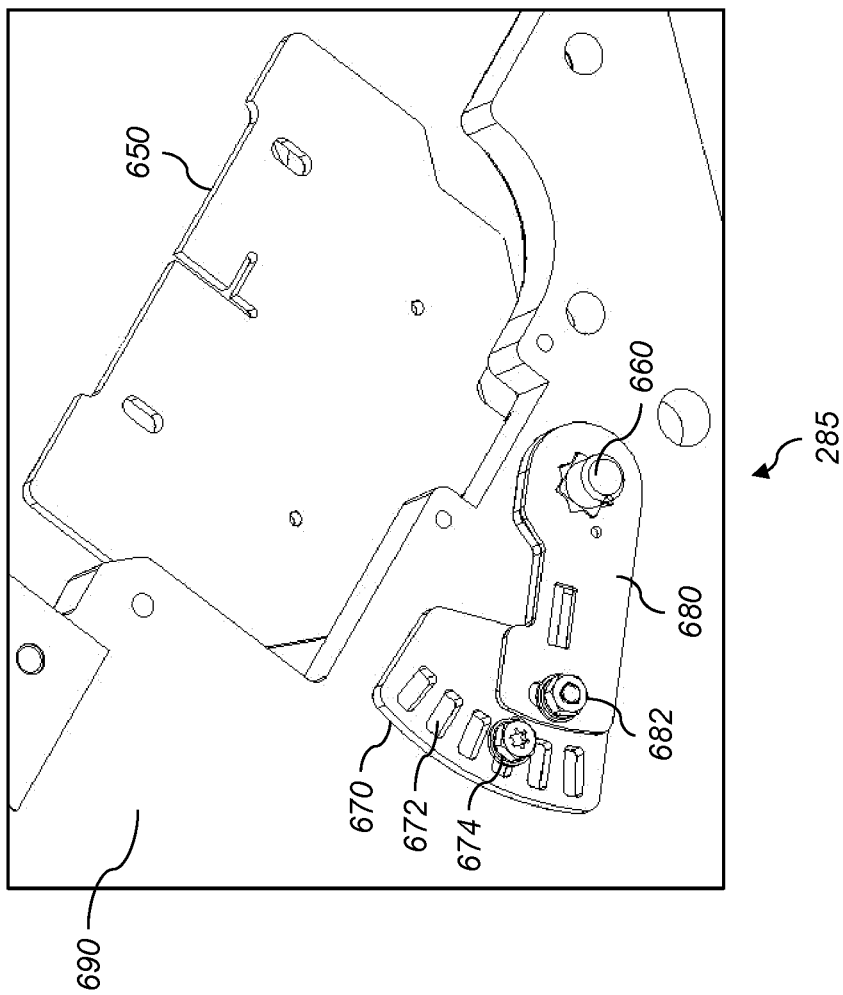
FIG. 17E shows the focus adjustment mechanism of FIG. 17A in the context of other printer components.

FIG. 17C illustrates additional details of the adjustment plate 670 and the anti-backlash plate 680. The adjustment plate 670 includes a series of slots 672 which define a series of angular orientations that can be selected to provide for fine adjustment on the orientation of the eccentric pin 660. The slots 672 are aligned radially with respect to the axis A of the eccentric pin 660 (FIG. 17B). In the illustrated configuration, there are six slots 672 separated by 7.5° increments to provide six corresponding fine adjustment positions. As illustrated in FIG. 17E, once the adjustment plate 670 has been positioned in the desired orientation, a bolt 674 is inserted through the appropriate slot and is threaded into a hole in plate 690. A fiducial 676 identifies one of the slots 672 that corresponds to a nominal orientation. The bolt 674 is only one example of a fastener that can be used to lock the eccentric pin 660 and the adjustment plate 670 in position. In other embodiments, any appropriate type of fastener known in the art can be used in accordance with the present invention, including various clamping mechanisms and set screw mechanisms.

FIG. 17D illustrates an alternate configuration for the adjustment plate 670 in which the plurality or radial slots 673 of FIG. 17C are replaced by a single arc-shaped slot 673 arranged at a fixed radius of curvature relative to the pin axis A. As with the FIG. 17C configuration, once the adjustment plate 670 has been positioned in the desired orientation, a bolt 674 is inserted through the appropriate slot and is threaded into a hole in plate 690 (FIG. 17E). This enables the adjustment plate to be rotated to a continuum set of adjustment angles rather than a discrete set of adjustment angles. A scale 675 can be provided to enable the operator to set the adjustment angle to a specified position.

In order to enable the adjustment plate 670 to be moved to different orientations, there must be a clearance between the gripping feature 678 of the adjustment plate 670 and the gripping feature 666 of the eccentric pin 660. This can result in "backlash" as the adjustment plate 670 is able to rotate slightly relative to the eccentric pin 660. An anti-backlash plate 680 is provided in order to tightly grip the eccentric pin 660. The anti-backlash plate 680 includes gripping feature 678 that are identical to those of the adjustment plate 670. The gripping features 678 fit over the gripping features 666 of the eccentric pin 660. After the adjustment plate 670 has been positioned in the desired orientation, the anti-backlash plate 680 is rotated slightly until the gripping feature 666 of the eccentric pin 660 is tightly gripped by the gripping features 678 of the adjustment plate 670 and the anti-backlash plate 680. To facilitate the rotation of the anti-backlash plate 680, slot features 686 are provided in both the adjustment plate 670 and the anti-backlash plate 680. The slot features 686 are partially overlapping and offset slightly from each other, and are configured such that a standard flat-head screwdriver blade can be inserted into the slot features 686 and twisted to provide a torque force on the anti-backlash plate 680. A bolt 682 is then inserted through a slot 688 in the anti-backlash plate 680 and is threaded into a hole in the adjustment plate 670 to lock the anti-backlash plate 680 into position.

In the illustrated configuration, the combination of the coarse adjustment provided by positioning the gripping feature 678 of the adjustment plate 670 relative the gripping feature 666 of the eccentric pin together with the fine adjustment provided by the slots 672 in the adjustment plate 670, enable the eccentric pin to be rotated through a 180° range in 7.5° increments. This enables the plate 650 (and consequently the corresponding end 251, 252 of the linear printhead 250) to be adjusted with a step size of 30 μm or less. In the illustrated configuration where the eccentric ring 664 has a circular shape, there will be a non-linear relationship between the rotation angle of the eccentric pin 660 and the resulting vertical offset of the plate 650. In alternate configurations, the eccentric ring 664 can be replaced with a non-circular cam that can be designed to provide a desired relationship (e.g., a linear relationship) between the rotation angle of the eccentric pin 660 and the resulting vertical offset of the plate 650.

The image quality of printed images formed using the printer 100 (FIG. 1) will be highly influenced by the dot shapes of the exposure spots 280 formed using the LED light sources 255 in the linear printhead 250. The dot shape for each pixel will be heavily impacted by the focus position of the corresponding portion of the linear printhead 250. The dot shape begins to converge when the pixel is correctly focused on the photoreceptor 206, but quickly diverges when the linear printhead 250 is positioned outside of the depth of focus D.

Accurately adjusting the focus position of the linear printhead 250 after it has been installed in the printer 100 can be a very difficult process because the geometry of the printer typically makes it impossible to directly view the exposure spot 280 with appropriate magnification to assess whether it is properly focused. It is also difficult to assess whether the printhead is accurately focused by visually examining conventional focus targets printed using the linear printhead 250. In some arrangements, high precision distance gauges can be provided at the ends 251, 252 of the linear printhead 250 in order to accurately measure and adjust the spacing S to achieve an aim spacing. This approach is costly and inefficient since this high precision gauges will only be used very rarely during the life span of the linear printhead 250 after the initial installation.

Inventors have discovered that the focus state of the linear printhead 250 can be accurately assessed by printing a specially designed target including variable width lines and analyzing the printed target using a process that detects certain line attributes that are characteristics of the focus state of the pixels in the linear printhead 250. In particular, it has been observed that for a well-focused light source 255 there is a characteristic linewidth progression associated with the variable width lines, but this linewidth progression changes with increasing amounts of defocus in a manner that can be used to characterize the amount of defocus. Thin lines tend to get thinner for defocused pixels, while thick lines tend to get thicker. Furthermore, the aberrations associated with defocused lenslet arrays 260 tend to get more variable depending on how the light sources 255 are aligned with the optical axes of the individual lenslets 265. This causes the shape of the exposure spots to become less consistent, and therefore the linewidth progressions also become less consistent. These characteristics can be detected by analyzing the printed line targets in order to assess an amount of defocus and determine appropriate focus adjustments.

Aspects of the present invention will now be described with reference to FIG. 5, which shows a flow chart of a method for adjusting a focus position of a linear printhead 250 (FIG. 3) in a digital printing system. As discussed earlier with reference to FIG. 3, the linear printhead 250 includes a linear array of light sources 255 focused onto a photosensitive medium. In an exemplary embodiment, the digital printing system is an electrophotographic printer 100 (FIG. 1) including an exposure subsystem 220 (FIG. 2) having a linear array of LED light sources focused onto a photoreceptor 206 (FIG. 2) that moves past the linear printhead 250 in an in-track direction 270. However, it will be obvious to one skilled in the art that the method can also be used in other types of digital printing systems that form images onto other types of photosensitive media.

In an exemplary arrangement, the described method is performed in the factory during the assembly of the digital printer 100. The method can also be performed in the field by a human operator, for example at predefined time intervals, or when it is determined that the linear printhead 250 has become defocused.

A set initial focus position step 300 is used to set a focus position 305 of the linear printhead 250 to an initial focus position. In some embodiments, the focus position 305 is adjusted using manually-operated focus adjustment mechanisms 285 (FIG. 4). In other embodiments, the focus adjustment mechanisms can be controlled by an automated process, such as with computer-controlled stepper motors.

In some arrangements, the initial focus position can be a nominal position where the linear printhead 250 will be properly focused if all of the components have been properly assembled at their design positions. However, due to manufacturing tolerances, the nominal focus position may not be within the depth of focus D of the lenslet array 260 (see FIG. 4).

In other arrangements, the linear printhead 250 can be positioned in an initial tilted orientation such that the first end 251 of the linear printhead 250 is spaced closer to the photoreceptor 206 than the second end 252 of the linear printhead 250, with the first end 251 being outside of the correct focus position and the second end 252 being inside the correct focus position. In this configuration, there will be a cross-track position somewhere along the length of the linear printhead 250 which will be properly focused. With this arrangement, the properly focused position can be determined using the process that will be described below, and then the focus positions of the two ends 251, 252 of the linear printhead 250 can be adjusted such that the spacing matches that of the properly focused position.

A print line image step 315 is used to print a line image 310. The printing of the line image 310 includes activating the light sources 255 (FIG. 3) in the linear printhead 250 (FIG. 3) in accordance with digital image data associated with the line image 310 to provide an exposure pattern on the photosensitive medium (e.g., photoreceptor 206) in order to produce a corresponding printed line image. In an exemplary embodiment, pixel values of the line image 310 are used to control exposures provided by the individual light sources 255. Columns of the line image 310 will be printed by a particular light source 255, with rows of the line image 310 being printed as the photosensitive medium passes by the linear printhead 250. In some configurations, the code values of the digital image data control the length of time that the light sources 255 are activated for each pixel of the line image 310 in order to provide the desired exposure pattern. In other configurations, the code values of the digital image data can control the intensity of the light sources 255.

Figure 6:
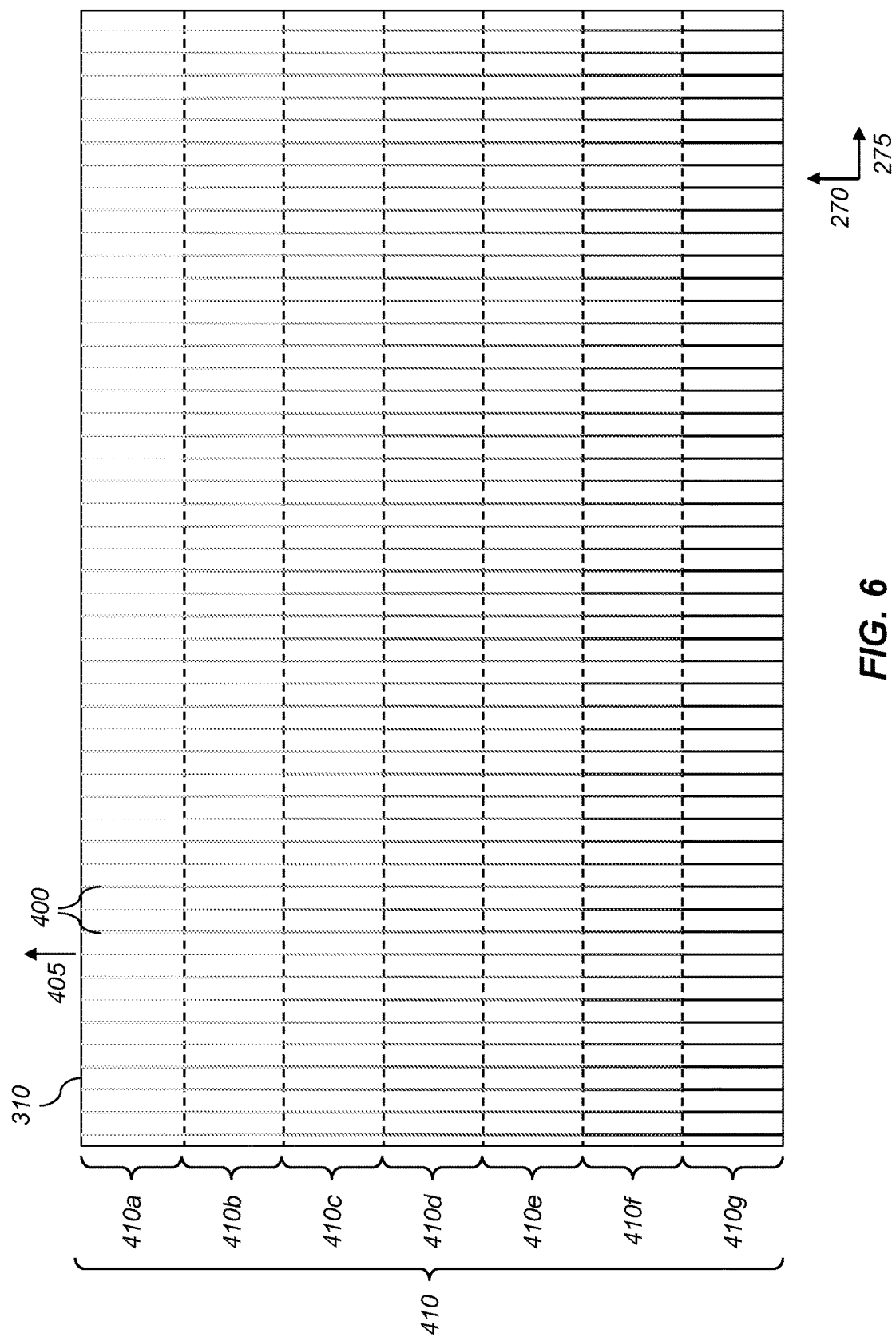
FIG. 6 shows an exemplary line image for printing a plurality of lines having varying linewidths.

An example of a line image is shown in FIG. 6. The line image 310 is defined by digital image data specifying a plurality of lines 400 to be printed at different cross-track positions (i.e., positions separated in the cross-track direction 275). Since the cross-track direction 275 will be aligned with the length of the linear printhead 250, each line 400 will be printed using a different portion of the linear printhead 250. Within the context of the present invention, the term "portion of the linear printhead 250" refers to a light source 255, or a group of light sources 255, located in a localized region of the linear printhead 250. The lines 400 extend in a length direction 405, which is preferably parallel to the in-track direction 270, and produce printed lines having linewidths that vary along the length direction 405. In an exemplary configuration, a set of linewidth zones 410 are provided, within which the linewidth of the printed lines 400 is constant. In the illustrated example, the line image 310 includes seven linewidth zones 410a, 410b, 410c, 410d, 410e, 410f, 410g corresponding to seven different linewidths. In other configurations, different numbers of linewidth zones 410 can be used, or the linewidth can be varied in a continuous fashion along the length of the lines 400.

Figure 7:
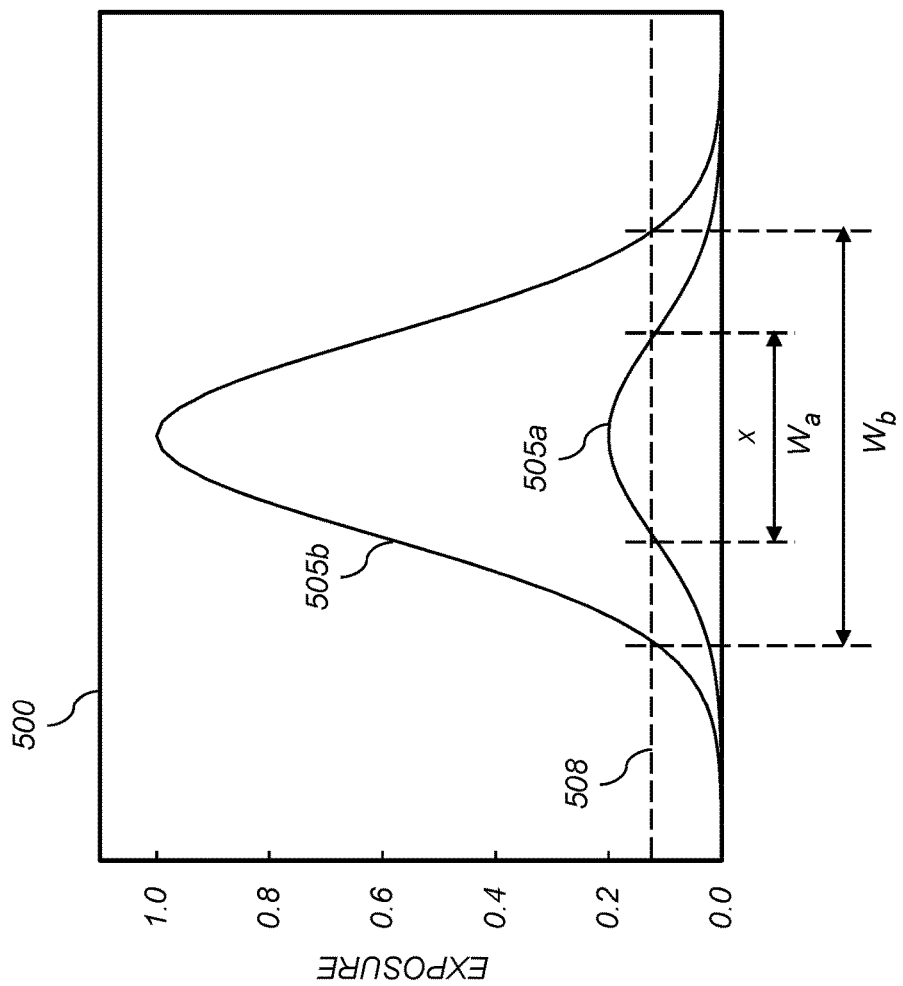
FIG. 7 illustrates cross-sectional exposure profiles corresponding to different exposure levels.

The digital image data of the line image 310 can control the linewidth of the lines 400 in the printed image in any appropriate manner. In an exemplary configuration, the lines 400 of the line image 310 are a single pixel wide, where the code values of the pixels in the lines 400 control the linewidth of the printed lines 400 by controlling the exposure provided by the individual light sources 255 (FIG. 3). For example, FIG. 7 shows an exposure graph 500 showing cross-sectional exposure profiles 505a, 505b corresponding to two different code values of the line image 310. For cases where the photosensitive medium has a threshold exposure 508 below which no density will be produced in the printed image, the printed lines will have respective widths $W_a$, $W_b$, which can be controlled with the code value. In other cases the linewidths of the printed lines can be controlled using other means, such as by controlling the number of adjacent light sources 255 that are activated to print the lines.

For clarity purposes, the line image 310 of FIG. 6 includes fifty lines 400. In a preferred embodiment, the line image 310 includes a much larger number of lines 400 to provide a more accurate assessment of the defocus characteristics as a function of position along the linear printhead 250 (FIG. 3). In an exemplary configuration, the linear printhead 250 includes 8,064 light sources 255, and the line image 310 includes single pixel wide lines that are separated by four non-printing pixels. In this case, the line image 310 will include approximately 1,600 lines 400.

In some implementations, the line image 310 can be specified using a predetermined array of pixel values that are sent down to the printer 100 and used to control the light sources 255 of the linear printhead 250. However, in some cases the interface to the printer 100 can require that the image data be compressed before sending it to the printer interface. The compressed image data is then decompressed before it is printed. This can result in the code values of the fine lines 400 in the line image 310 being modified by the compression-decompression process. This could produce inconsistencies in the printed lines that can interfere with the subsequent analysis. To avoid this problem, in some arrangements the digital image data is specified using an array of uniform patches of continuous tone pixels values, the pixel values varying from lighter values to darker values in the length direction (i.e., the in-track direction), with different pixel values being associated with each of the linewidth zones 410. The uniform patches of pixel values in the continuous tone digital image data will generally be unmodified by the compression-decompression process. Once the continuous tone digital image data has been sent down to the printer 100, it can then be processed using a line screen halftone process to provide the plurality of lines 400 in the line image 310.

In an exemplary arrangement, the line screen halftone process is performed by providing a specially-designed halftone screen to a conventional halftoning process. In a preferred arrangement, the halftone screen is specified by a 3D array, where one of the array dimensions is indexed by the input pixel value, and the other two array dimensions are indexed by spatial pixel locations within a halftone cell. Planes within the 3D array corresponding to a particular input pixel value store the halftone pattern to be printed at that input pixel value. In the specially-designed halftone screen, the halftone screen elements corresponding to the non-printing pixels between the lines 400 will all have values of zero so that the light sources 255 (FIG. 3) are not activated for these pixels. The halftone screen elements at spatial positions corresponding to the lines 400 will be specified so that the lines 400 in the line image 310 will have code values corresponding to the continuous tone pixels values of the uniform patches.

Figure 5:
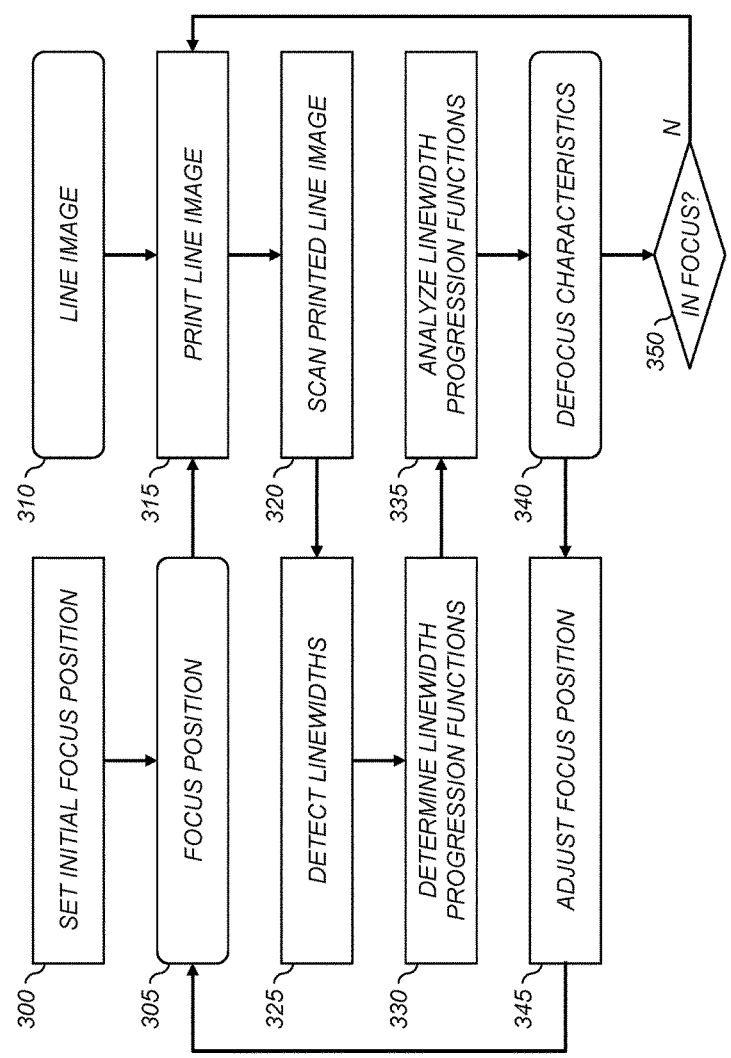
FIG. 5 is a flow chart of a method for adjusting a focus position of a linear printhead according to an exemplary embodiment.

Returning to a discussion of FIG. 5, a scan printed line image step 320 is next used to capture an image of the printed line image. In some arrangements, the scan printed line image step 320 uses a digital image capture system (e.g., an optical scanner system or a digital camera system) that is integrated into the printer 100 (FIG. 1) so that the image of the printed line image can be captured as it travels through the printer 100. In other arrangements, an operator can remove the printed line image from the printer 100 and an external imaging system (e.g., a flatbed scanner) can be used to provide the captured image. The spatial resolution of the captured image should be large enough to determine the linewidth of the printed lines 400 with sufficient accuracy. In an exemplary configuration, the light sources 255 of the linear printhead 250 are spaced at 600 pixels/inch, and the printed line image is scanned using a flatbed scanner at a spatial resolution of 1200 pixels/inch. It has been found that this enables the linewidth of the lines 400 to be determined with adequate accuracy for the present application.

A detect linewidths step 325 is used to analyze the captured image to determine linewidth parameters representing linewidths of the plurality of lines in the printed line image at a plurality of positions along the length direction. This step is performed automatically using a data processor. Preferably, the linewidths of each of the lines 400 (FIG. 6) in the printed line image 310 (FIG. 6) are determined in each of the linewidth zones 410 (FIG. 6). In an exemplary arrangement, a plurality of rows in the captured image are averaged together in each of the linewidth zones 410 to determine line profiles corresponding to cross-sections through the printed lines 400.

In some embodiments, before the rows in the captured image are averaged together, a skew correction operation is performed to detect and correct any skew in the captured image to insure that the printed lines are aligned with the columns in the captured image. Skew correction algorithms are well-known in the image processing art, and any such algorithm can be used in accordance with the present invention. In an exemplary arrangement, the skew correction algorithm detects the orientation of the lines 400 along the edges of the image to determine a rotation angle. In some embodiments, the captured image can be rotated to correct for the rotation angle. In other arrangements, the process of determining the line profiles can be designed to account for the rotation angle in order to avoid the computationally costly rotation operation. This approach also has the advantage that it avoids the interpolation errors that can be associated with rotation operations.

Figure 8:
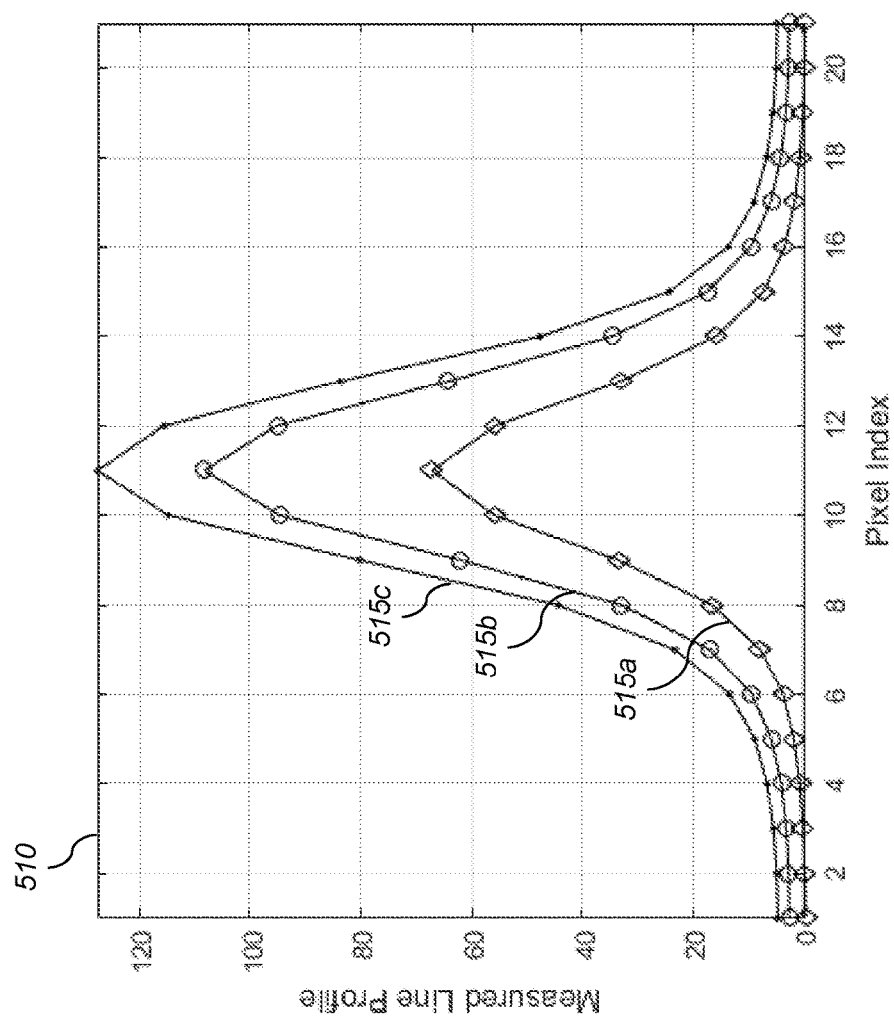
FIG. 8 shows an exemplary set of measured line profiles.

FIG. 8 shows a line profile graph 510, illustrating exemplary line profiles 515a, 515b, 515c determined for three of the different linewidth zones 410 (FIG. 6) for a particular line 400 (FIG. 6). Line profile 515a corresponds to a thin line, line profile 515b corresponds to an intermediate line, and line profile 515c corresponds to a thick line. The x-axis of the line profile graph 510 is in terms of the number of scanner pixels (e.g., 1200 dpi pixels). The y-axis is inverted scanner code values (i.e., 255-scanner code value) so that white paper is nominally at a code value of zero. It can be seen that the line profiles 515a, 515b, 515c vary in linewidth as well as in amplitude. Note that the linewidths of the line profiles 515a, 515b, 515c include contributions from the MTF of the scanner, as well as the linewidths of the printed lines. Therefore, the shapes of the determined scanner profiles will depend on the image capture device used to provide the captured image. As a result, if the image capture device is changed it may be necessary to adjust certain aspects of the processing described below to account for the differences in the scanner MTF.

Once the line profiles have been extracted, the detect linewidths step 325 (FIG. 5) determines linewidth parameters representing linewidths of the lines by analyzing the extracted line profiles. The linewidth parameters can take various forms in different implementations. In some cases, an appropriate linewidth metric, such as the well-known full-width half-maximum (FWHM) linewidth can be computed from the line profiles. In some cases, the linewidth metric can be computed directed from the extracted line profile. Alternatively, a smooth function (e.g., a Gaussian function) can be fit to the extracted line profile, and the linewidth metric can be computed from the smooth function. This has the advantage of reducing variability than can result from computing the linewidth metric directly from the measured data.

Since the amplitude of the line profiles is closely correlated with the linewidth of the line profiles, an amplitude metric can also be used as a type of "linewidth parameter." In some implementations, the maximum heights of the line profiles can be used directly for the linewidth parameters. In other implementations, a nominal line profile shape can be defined, and scale factors can be determined that can be applied to the nominal line profile shape to fit the extracted line profiles. The determined scale factors can then be used for the linewidth parameters. The nominal line profile shape can be defined by averaging a set of normalized line profiles, or using a singular value decomposition of a set of line profiles to extract a characteristic line profile. Alternatively, the nominal line profile shape can be a predefined smooth function such as a Gaussian function.

Figure 9:
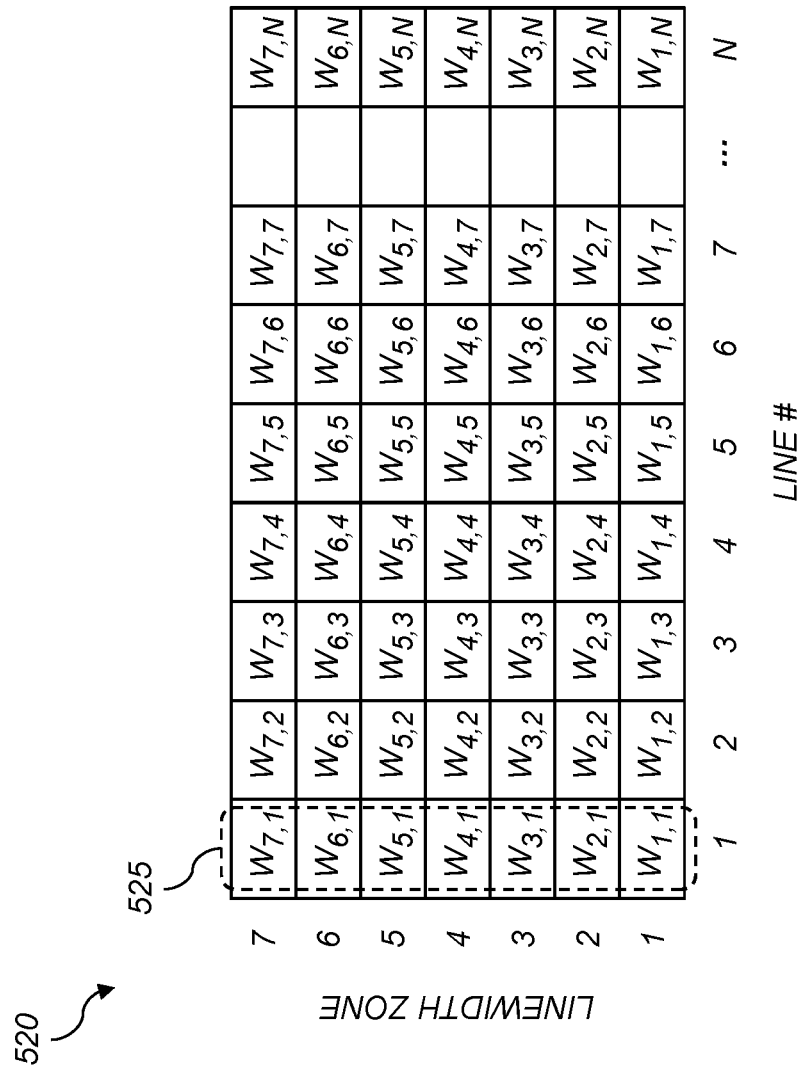
FIG. 9 illustrates a linewidth array for storing linewidth projection functions for a plurality of lines.

Returning to a discussion of FIG. 5, a determine linewidth progression functions step 330 determines linewidth progression functions for each of the lines in the printed line image responsive to the determined linewidths. The linewidth progression functions represent the linewidth parameters as a function of position along the length direction and characterize the linewidth progression along the printed lines. The linewidth progression functions can be represented in any appropriate form in accordance with the present invention. In an exemplary embodiment, the linewidth progression function for a particular line 400 (FIG. 6) is a discrete function specified by the set of determined linewidth parameters for each of the linewidth zones 410 (FIG. 6). In some implementations it is convenient to collect the linewidth progression functions 525 into a linewidth array 520 as illustrated in FIG. 9. Each cell in the linewidth array 520 stores the linewidth parameter $W_{i,j}$ for the $i^{th}$ linewidth zone and the $j^{th}$ line, where each row of the linewidth array 520 corresponds to a different linewidth zone 410, and each column corresponds to a different line 400 (where N is the number of lines 400 in the line image 310). The linewidth parameters in a particular column of the linewidth array 520 represents the linewidth progression function 525 for the corresponding line.

Once the linewidth progression functions are determined for each of the lines, the next step in the method of FIG. 5 is an analyze linewidth progression functions step 335, which is used to determine defocus characteristics 340 of the linear printhead by analyzing the linewidth progression functions. Additional detail for the analyze linewidth progression functions step 335 according to an exemplary embodiment are shown in FIG. 10.

There can be a significant amount of variability in the measured linewidth progression functions due to noise in the measurements of the linewidths. In some embodiments, the analyze linewidth progression functions step 335 includes a smooth linewidth progression functions step 600 which applies a smoothing operation to reduce the variability in the linewidth progression functions 525. In an exemplary configuration, a smoothing operation is applied to each row of the linewidth array 520 (FIG. 9). Any appropriate smoothing operation known in the data processing art can be used.

Figure 11:
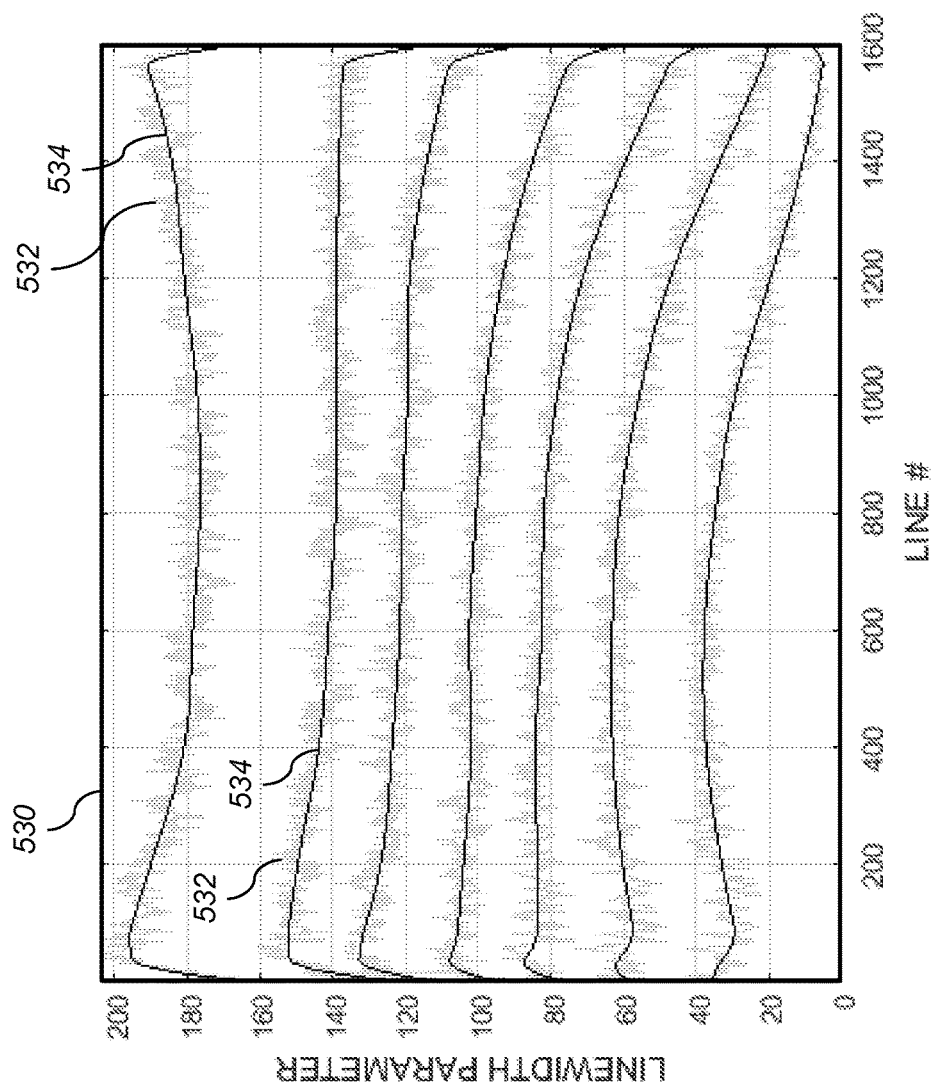
FIG. 11 illustrates the use of a smoothing operation to smooth the measured linewidth data.

In a preferred embodiment, the rows of the linewidth array 520 are smoothed by fitting a spline function to the measured linewidth values in each row of the linewidth array 520. FIG. 11 illustrates a linewidth graph 530 showing the results of applying this type of smoothing operation to an exemplary set of linewidth data. The linewidth graph 530 includes seven measured linewidth curves 532, each corresponding to one of the rows of the linewidth array 520, which includes linewidth parameter values measured for each line 400 (FIG. 6) in a particular linewidth zone 410. Smoothed linewidth curves 534 are overlaid on the measured linewidth curves 532, showing the results of applying the smoothing operation. In can be seen that the linewidths of the smoothed linewidth curves 534 have much lower noise levels than the measured linewidth curves 532. Other appropriate smoothing operations that could be used would include applying a low-pass filter or a Kalman filter, or using a wavelet de-noising process.

Figure 10:
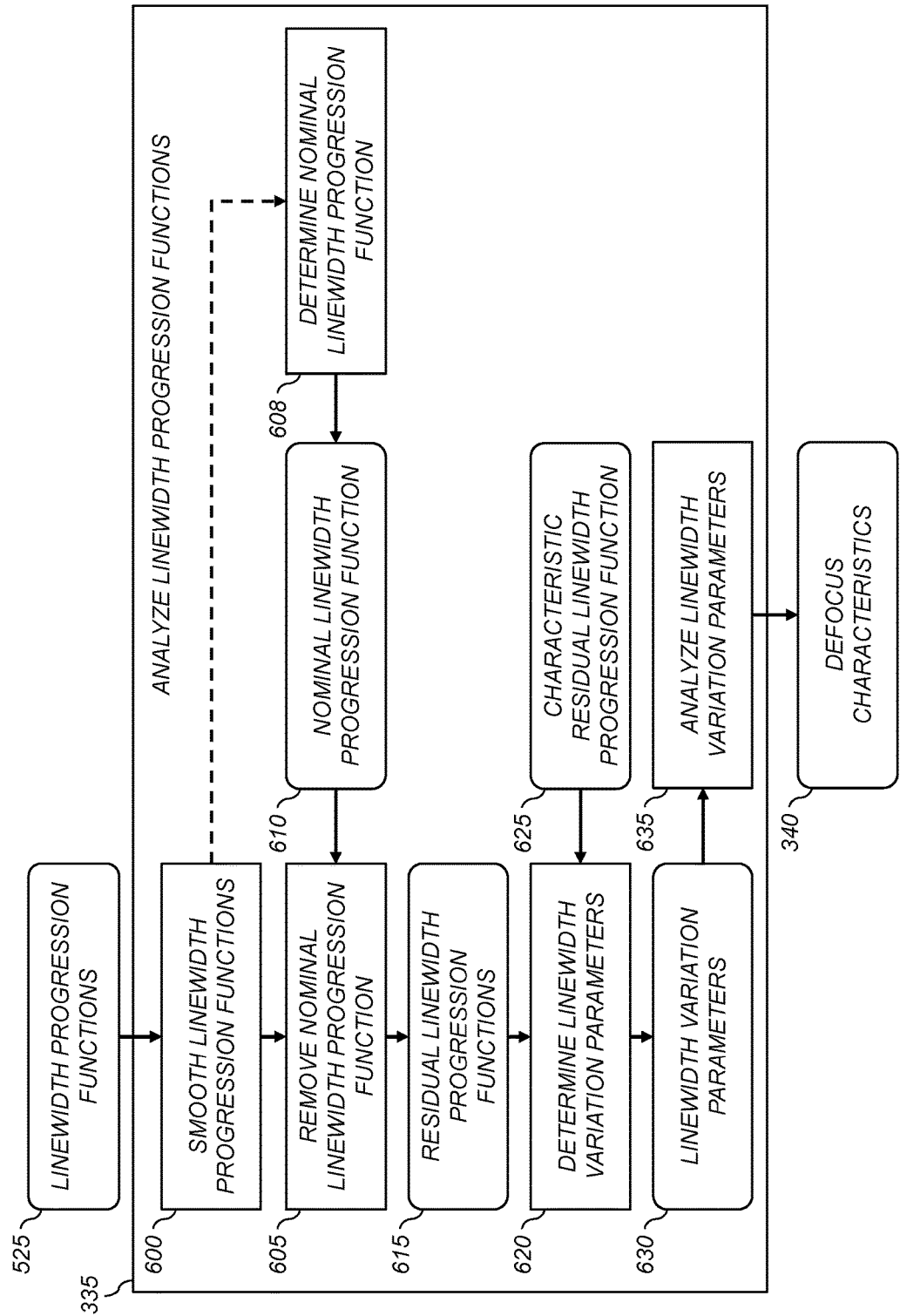
FIG. 10 is a flow chart showing additional details of the analyze linewidth progression functions step of FIG. 5 according to an exemplary embodiment.

In the configuration illustrated in FIG. 10, the analyze linewidth progression functions step 335 includes a remove nominal linewidth progression function step 605 which applies an operation to remove a nominal linewidth progression function 610 from each of the linewidth progression functions 525 to determine residual linewidth progression functions 615. For example, the nominal linewidth progression function 610 can be subtracted from each of the linewidth progression functions 525 to determine the residual linewidth progression functions 615:

$$R_i(z)=P_i(z)-N(z) \qquad (1)$$

where $P_i(z)$ is the linewidth progression function 525 for the $i^{th}$ line, $N(z)$ is the nominal linewidth progression function 610, $R_i(z)$ is the residual linewidth progression function 615 for the $i^{th}$ line, each of which is a function of the linewidth zone z.

The nominal linewidth progression function 610 can be provided using a determine nominal linewidth progression function step 608. In some embodiments, the nominal linewidth progression function 610 can correspond to a predetermined nominal linewidth progression function which is predetermined for a properly focused linear printhead 250 (FIG. 3). The residual linewidth progression functions 615 will then represent the difference between the expected linewidth progression function for a properly focused linear printhead 250 and the actual linewidth progression functions 525.

In other embodiments, the nominal linewidth progression function 610 is determined from the set of measured linewidth progression functions 525 (preferably after they have been smoothed by the smooth linewidth progression functions step 600). This approach has the advantage of being less sensitive to process variations than using a predetermined nominal linewidth progression function because the nominal shape of the linewidth progression function can be affected by the performance of the printer 100 (FIG. 1), as well as the focus characteristics of the linear printhead 250. In some configurations, the nominal linewidth progression function 610 is determined by performing an operation that averages a plurality of the measured linewidth progression functions 525. In a preferred configuration, the nominal linewidth progression function 610 is determined by performing a singular value decomposition analysis or an eigenvector analysis on the smoothed linewidth progression functions 525 stored in the linewidth array 520 (FIG. 9) to extract a vector representing a nominal linewidth progression function 610. Singular value decomposition analysis techniques and eigenvector analysis techniques will be well-known to one skilled in the data processing art.

It has been observed that the shape of the residual linewidth progression functions 615 for defocused printheads typically have a characteristic shape reflecting the fact that the defocus will affect thin lines differently than it affects thicker lines. This tends to produce a trend in the linewidth progression which shows up as streaks in the printed line image 310 (FIG. 6). The streaks often manifest themselves where a particular line 400 is lighter (thinner) than the surrounding lines at one end and darker than the surrounding lines at the other end.

Figure 12:
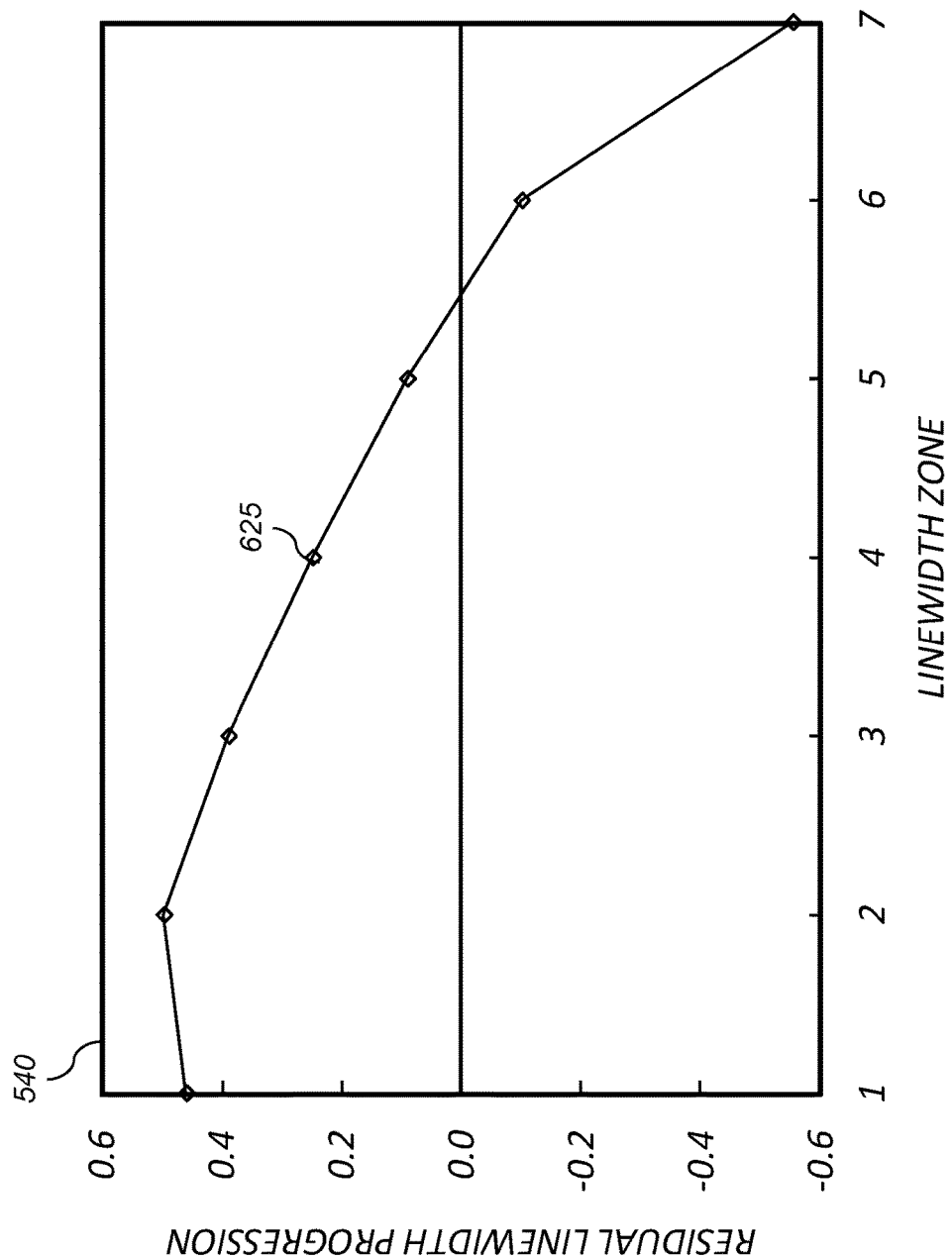
FIG. 12 shows an exemplary characteristic residual linewidth progression function.

A characteristic residual linewidth progression function 625 can be determined by analyzing a set of residual linewidth progression functions 615 for printheads with different focus states. FIG. 12 shows a graph 540 illustrating an exemplary characteristic residual linewidth progression function 625 that is representative of the residual linewidth progression functions 615 that result when the linear printhead 250 (FIG. 3) is defocused. This characteristic residual linewidth progression function 625 was determined by analyzing a data set including residual linewidth progression functions 615 for a variety of defocus positions, and computing the second singular vector in a singular value decomposition, which represents the largest component of the differences between the residual linewidth progression functions 615.

A determine linewidth variation parameters step 620 (FIG. 10) is now used to determine linewidth variation parameters 630 for each of the lines 400 (FIG. 6). In an exemplary embodiment, the process applied by the determine linewidth variation parameters step 620 includes projecting each of the residual linewidth progression functions 615 onto the characteristic residual linewidth progression function 625 to determine the corresponding linewidth variation parameters 630. This projection can be performed using a vector dot product:

$$V_i = R_i(z) \cdot \frac{C(z)}{|C(z)|} \tag{2}$$

where $R_i(z)$ is a vector representing the residual linewidth progression function 615 for the $i^{th}$ line, $C(z)$ is a vector representing the characteristic residual linewidth progression function 625, and $V_i$ is the linewidth variation parameter 630 for the $i^{th}$ line.

Figure 13:
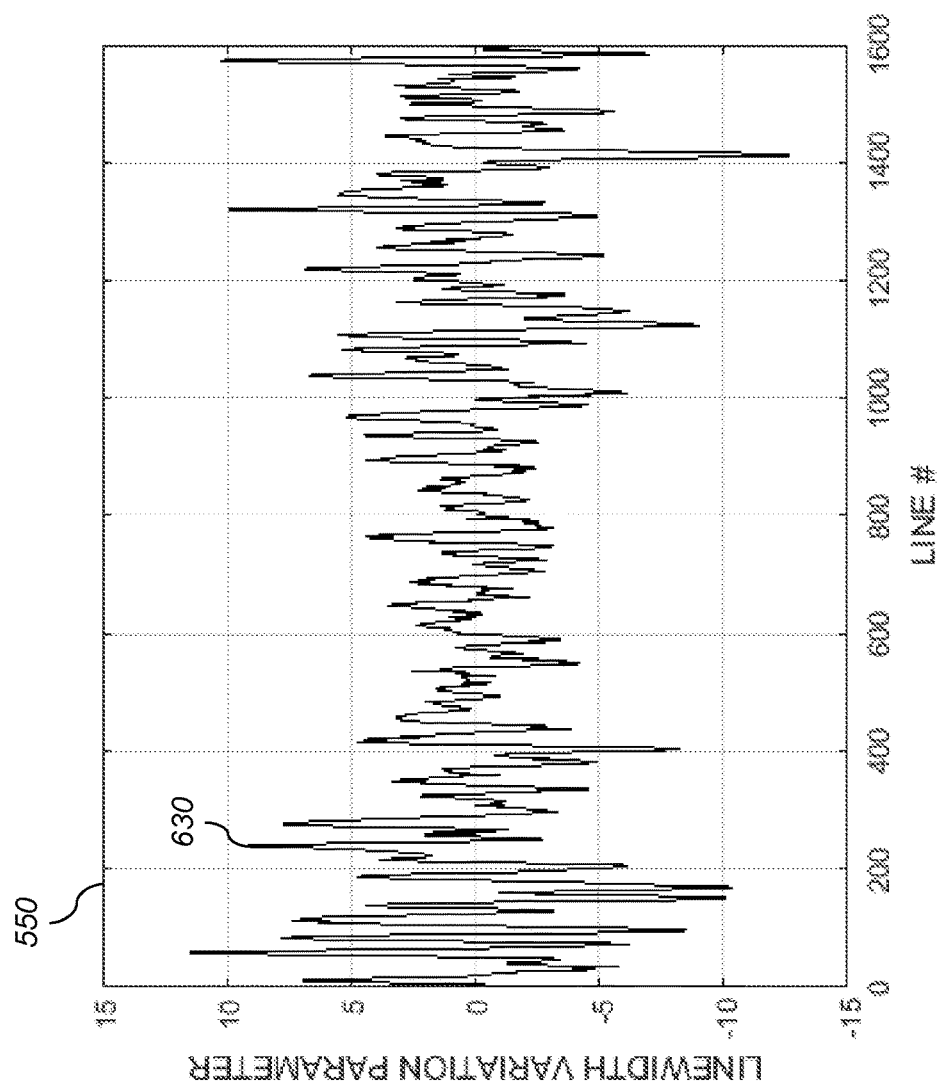
FIG. 13 shows an exemplary linewidth variation graph.

FIG. 13 shows a linewidth variation graph 550, which plots the linewidth variation parameters 630 determined for each line from the smoothed linewidth data of FIG. 11. This data corresponds to a tilted printhead configuration discussed earlier. It can be seen that the average magnitude of the linewidth variation parameters 630 is larger at the two ends where the linear printhead 250 (FIG. 3) has larger amounts of defocus and is smaller in a central region where the defocus is smaller. This information can be analyzed to determine the defocus characteristics of the linear printhead 250.

Figure 14:
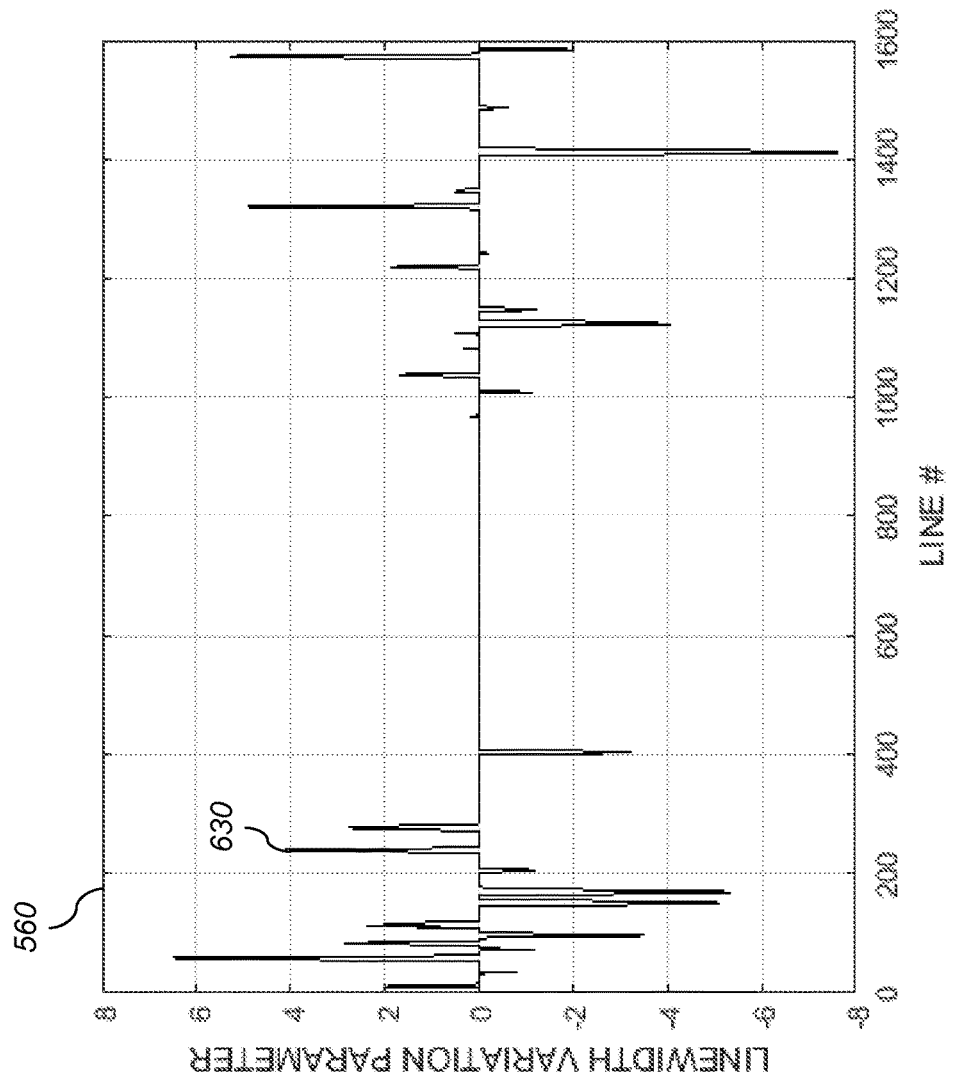
FIG. 14 shows an exemplary linewidth variation graph where a thresholding process has been used to remove noise.

Since larger amounts of defocus for the linear printhead 250 are characterized by larger magnitudes of the linewidth variation parameters 630, a thresholding operation can be used to set linewidth variation parameters 630 having magnitudes smaller than a predefined threshold to zero. The threshold is preferably determined such that the magnitudes of the linewidth variation parameters 630 for a properly focus printhead are smaller than the threshold. In an exemplary configuration, a soft thresholding operation is applied of the form:

$$V'_i = \begin{cases} V_i + T_V; & V_i < -T_V \\ 0; & -T_V \le V_i \le T_V \\ V_i - T_V; & V_i > T_V \end{cases} \tag{3}$$

where $V_i$ is the linewidth variation parameter 630 for the $i^{th}$ line, $V'_i$ is the thresholded linewidth variation parameter for the $i^{th}$ line, and $T_V$ is the threshold value. FIG. 14 shows a linewidth variation graph 560, which plots the thresholded linewidth variation parameters 630 determined from the data of FIG. 13 using a threshold value of $T_V=5$.

The analyze linewidth progression functions step 335 of FIG. 10 next uses an analyze linewidth variation parameters step 635 to analyze the determined linewidth variation parameters 630 to determine the defocus characteristics 340 of the linear printhead 250 (FIG. 3). The analyze linewidth variation parameters step 635 can determine the defocus characteristics 340 in various ways in different embodiments.

As discussed earlier, in some arrangements the set initial focus position step 300 (FIG. 5) positions the linear printhead 250 in an initial tilted orientation such that the first end 251 of the linear printhead 250 is spaced closer to the photoreceptor 206 than the second end 252 of the linear printhead 250, with the first end 251 being outside of the correct focus position and the second end 252 being inside the correct focus position. The linewidth variation parameters 630 shown in FIG. 14 were determined using such an arrangement. In this case, determining the defocus characteristics 340 using the analyze linewidth variation parameters step 635 preferably includes determining a cross-track position where the linear printhead 250 is properly focused by determining the cross-track position where the magnitudes of the linewidth variation parameters 635 are minimized. In an exemplary arrangement, this can be done by computing a cumulative linewidth variation function:

$$CV_i = \sum_{j=1}^{i} |V_j| \tag{4}$$

where $CV_i$ is the cumulative linewidth variation at the cross-track position corresponding to the $i^{th}$ line, which is determined by summing up the magnitudes of all of the linewidth variation parameters $|V_j|$ for the preceding cross-track positions.

Figure 15:
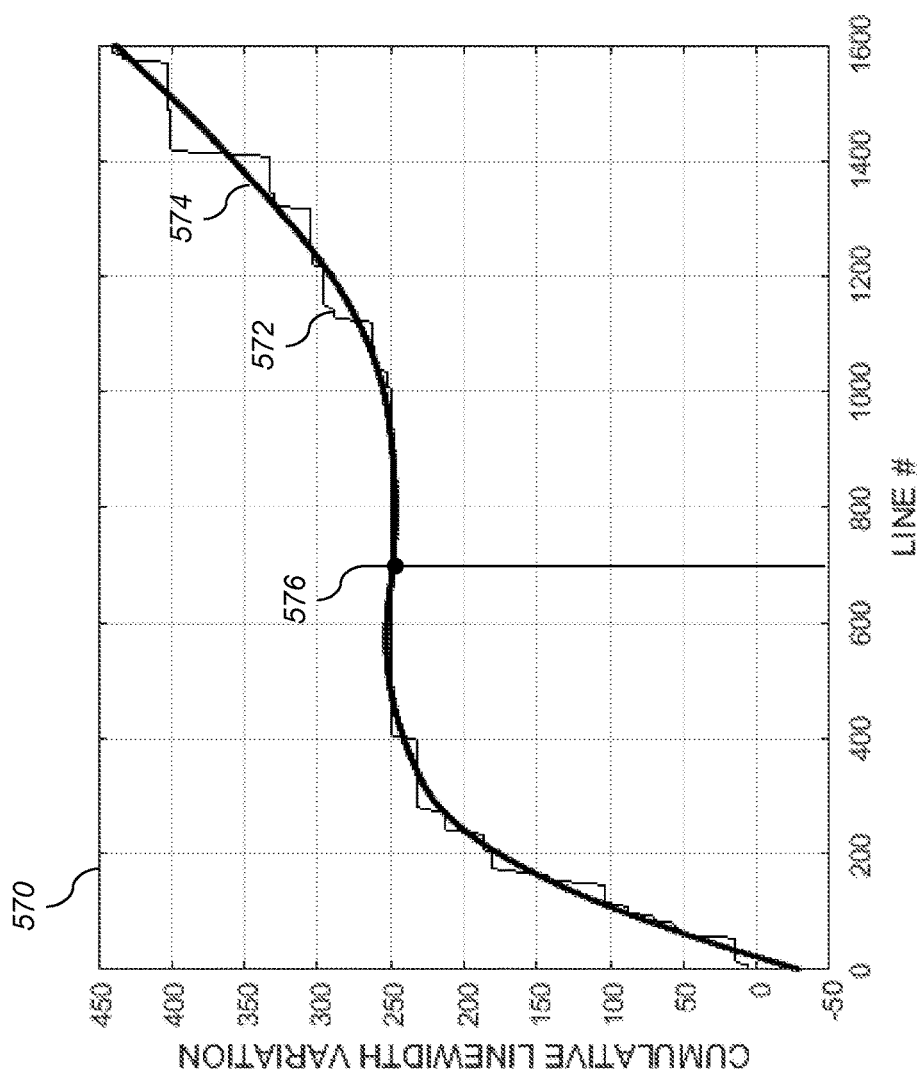
FIG. 15 shows an exemplary cumulative linewidth variation function.

FIG. 15 is a graph 570 showing a cumulative linewidth variation function 572 computed from the thresholded linewidth variation parameters 630 of FIG. 14. It can be seen that the cumulative linewidth variation function 572 has a flat area in the center where the focus position of the linear printhead 250 (FIG. 3) is within the depth of focus. The cross-track position where the linear printhead 250 is properly focused will be approximately in the center of the flat area. In some embodiments, this position can be identified by fitting a smooth function to the cumulative linewidth variation function 572 and finding an inflection point in the smoothed function. FIG. 15 shows a smoothed cumulative linewidth variation function 574 that was determined by defining a set of knot points and fitting a localized cubic spline function to each section of the cumulative linewidth variation function 572. In some configurations, the inflection point 576 of the smoothed cumulative linewidth variation function 574 can be used as an estimate of the cross-track position where the linear printhead 250 is properly focused. In other configurations, a region of the smoothed cumulative linewidth variation function 574 where the magnitude of the slope is less than a predefined threshold can be determined, and the cross-track position at the center of the region can be used as an estimate of the cross-track position where the linear printhead 250 is properly focused.

Figure 16:
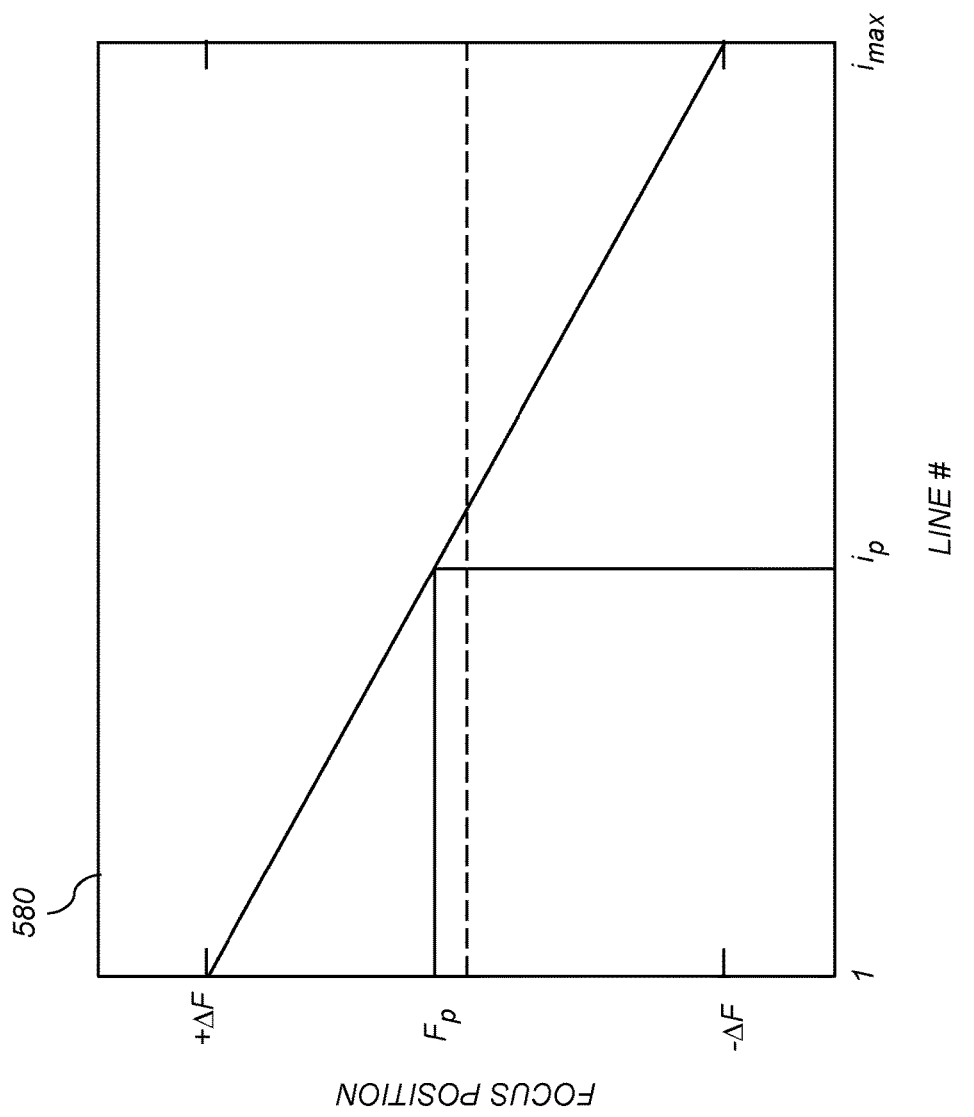
FIG. 16 shows a focus position function for a tilted printhead.

Once the cross-track position where the linear printhead 250 (FIG. 3) is properly focused has been determined, an adjust focus position step 345 (FIG. 5) is used to adjust the focus position of the linear printhead 250 such that the spacing between the linear printhead 250 and the photoreceptor 206 at the first and second ends 251, 252 of the linear printhead 250 is adjusted to match the spacing at the determined cross-track position. For example, if the initial focus position is set by shifting the focus position at the first end 251 (corresponding to the first line 400 of the line image 310) by +ΔF relative to a nominal position and shifting the focus position at the second end 252 (corresponding to the last line 400 of the line image 310) by −ΔF relative to the nominal position, it can easily be shown that the focus position F along the length of the linear printhead will be given by:

$$F = \Delta F - 2\Delta F \frac{(i-1)}{(N-1)} \quad (5)$$

where N is the total number of lines 400 in the line image 310. This function is illustrated in the graph 580 of FIG. 16. If the analyze linewidth variation parameters step 635 (FIG. 10) determines that the cross-track position where the linear printhead 250 is properly focused corresponds to line $i_p$, the corresponding focus position $F_p$ can be determined by substituting $i_p$ into Eq. (5). The adjust focus position step 345 can then set the focus positions at the first and second ends 251, 252 of the linear printhead 250 to this focus position.

In other arrangements, the set initial focus position step 300 (FIG. 5) may not position the linear printhead 250 in a tilted orientation, but rather at some nominal position. In this case, rather than determining a cross-track position where the linear printhead 250 is properly focused, the defocus characteristics 340 determined by the analyze linewidth variation parameters step 635 (FIG. 10) can include determining an estimated amount of defocus at one or more cross-track positions based on the magnitudes of the linewidth variation parameters 630. As can be seen from FIGS. 13 and 14, the average magnitude of the linewidth variation parameters 630 clearly varies as a function of the amount of defocus. Therefore, a calibration process can be used to determine a calibration function characterizing the average magnitude of the linewidth variation parameters 630 as a function of the amount of defocus. The average magnitude of the linewidth variation parameters 630 can then be determined for a printed line image 310 (FIG. 5), and can be used to determine an estimated amount of defocus based on the calibration function. The adjust focus position step 345 (FIG. 5) can then adjust the focus position of the linear printhead 250 in accordance with the estimated amount of defocus. It may not be possible to determine whether the amount of defocus is caused by the gap between the linear printhead 250 and the photoreceptor 206 being too large or too small. In such cases, an initial guess can be made as to the direction the focus position adjustment. A second iteration of the focus adjustment process of FIG. 5 can then be performed to verify that the focus adjustment was in the correct direction. If it was in the wrong direction, then the amount of defocus will get worse rather than better.

In some arrangements, the analyze linewidth variation parameters step 635 (FIG. 10) determines different estimated amounts of defocus for different cross-track positions along the linear printhead 250. For example, the average magnitude of the linewidth variation parameters 630 can be determined for a first set of lines near the first end 251, and for a second set of lines near the second end 252. The amount of defocus can then be independently estimated for the first and second ends 251, 252. The adjust focus position step 345 (FIG. 5) can then adjust the focus position of the first end 251 of the linear printhead 250 by a different amount than the second end 252 in accordance with the respective estimated amounts of defocus.

In some cases, the various computations associated with performing the method of FIG. 5 can be performed by a data processor which is integrated into the printer 100 (FIG. 1). In other cases, it can be performed using a data processor which is external to the printer 100 (e.g., a standalone data processing system such as a laptop computer). Additional attributes of data processing systems 710 and associated components that can be used to perform the method of the present invention will be discussed later with respect to FIG. 18.

The adjust focus position step 345 can be performed in various manners. In some embodiments, the focus adjustment mechanism 285 (FIG. 4) provided for the linear printhead 250 (FIG. 4) is an automatic mechanism that is interfaced with the data processing system used to determine the defocus characteristics 340. In this case, the data processing system can automatically control the focus adjustment mechanism 285 to make the appropriate adjustments to the focus position. In other embodiments, the focus adjustment mechanism 285 (FIG. 4) provided for the linear printhead 250 (FIG. 4) is a manual mechanism that is manually adjustable by a human operator. In this case, the data processing system used to calculate the defocus characteristics 340 can provide instructions to the human operator specifying what adjustments should be made to the focus position. For example, a message can be presented to the human operator using a user interface system 730 (see FIG. 18) instructing use human operator to adjust the focus adjustment mechanism 285 on the first and second ends 251, 252 of the linear printhead 250 to specified settings. In an exemplary configuration using the focus adjustment mechanism of FIGS. 17A-17E, the user interface system 730 can instruct the human operator where to position the fiducial 668 of the eccentric pin 660 relative to the fiducial 684 of the anti-backlash plate 680, and which slot 672 the bolt 674 should be inserted through relative to the fiducial 676.

In some embodiments, the focus adjustment process of FIG. 5 can be performed iteratively until the linear printhead 250 is in an acceptable focus position. In such cases, an in focus test 350 can be used to determine whether the defocus characteristics 340 indicate that the linear printhead 250 is acceptably focused. In some cases, the in focus test 350 can compare the average magnitude of the linewidth variation parameters 630 (FIG. 10) to a predetermined threshold. In other cases, the in focus test 350 can compare the estimated amount of defocus to a predetermined depth of focus threshold. If the in focus test 350 determines that the linear printhead 250 is not acceptably focused, then the focus adjustment process is repeated by printing another line image 310 at the updated focus position 305. In some arrangements, the first iteration can be performed using an initial tilted orientation for the linear printhead 250 (FIG. 3). The focus positions for the first and second ends 251, 252 of the linear printhead 250 can then be adjusted to the focus position $F_p$ corresponding to the cross-track position where the linear printhead 250 is properly focused. Subsequent iterations can then verify that the updated focus position 305 is acceptable and fine tune the focus position if necessary.

Figure 18:
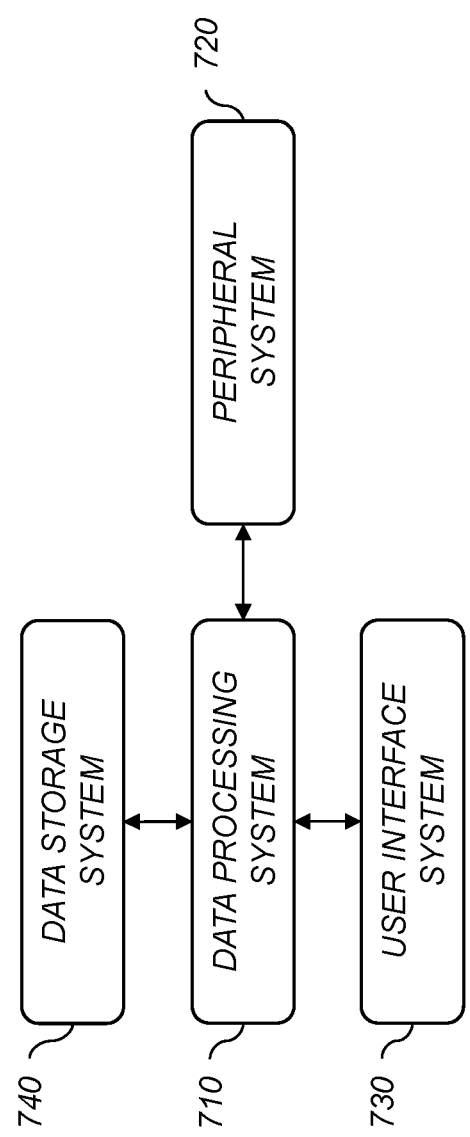
FIG. 18 is a high-level diagram showing the components of a system for performing elements of the present invention.

FIG. 18 is a high-level diagram showing the components of a system for performing steps associated with the method of the present invention. The system includes a data processing system 710, a peripheral system 720, a user interface system 730, and a data storage system 740. The peripheral system 720, the user interface system 730 and the data storage system 740 are communicatively connected to the data processing system 710.

The data processing system 710 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise. In some embodiments, the data processing system 710 a plurality of data processing devices distributed throughout various components of the printing system (e.g., the pre-processing system and the print engine).

The data storage system 740 includes one or more processor-accessible memories configured to store information, including the information needed to execute the processes of the various embodiments of the present invention, including the example processes described herein. The data storage system 740 may be a distributed processor-accessible memory system including multiple processor-accessible memories communicatively connected to the data processing system 710 via a plurality of computers or devices. On the other hand, the data storage system 740 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 740 is shown separately from the data processing system 710, one skilled in the art will appreciate that the data storage system 740 may be stored completely or partially within the data processing system 710. Further in this regard, although the peripheral system 720 and the user interface system 730 are shown separately from the data processing system 710, one skilled in the art will appreciate that one or both of such systems may be stored completely or partially within the data processing system 710.

The peripheral system 720 may include one or more devices configured to provide digital content records to the data processing system 710. For example, the peripheral system 720 can include image capture devices appropriate for performing the scan printed line image step 320 (FIG. 5) such as digital cameras or digital scanners. The peripheral system 720 can also include other types of devices such as other data processors. The data processing system 710, upon receipt of digital content records from a device in the peripheral system 720, may store such digital content records in the data storage system 740.

The user interface system 730 may include a mouse, a keyboard, another computer, or any device or combination of devices from which data is input to the data processing system 710. In this regard, although the peripheral system 720 is shown separately from the user interface system 730, the peripheral system 720 may be included as part of the user interface system 730.

The user interface system 730 also may include a display device, a processor-accessible memory, or any device or combination of devices to which data is output by the data processing system 710. In this regard, if the user interface system 730 includes a processor-accessible memory, such memory may be part of the data storage system 740 even though the user interface system 730 and the data storage system 740 are shown separately in FIG. 18.

A computer program product for performing aspects of the present invention can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations, combinations, and modifications can be effected by a person of ordinary skill in the art within the spirit and scope of the invention.

PARTS LIST 31 printing module
32 printing module
33 printing module
34 printing module
35 printing module
38 print image
39 fused image
40 supply unit
42 receiver
42a receiver
42b receiver
50 transfer subsystem
60 fuser module
62 fusing roller
64 pressure roller
66 fusing nip
68 release fluid application substation
69 output tray 70 finisher
81 transport web
86 cleaning station
99 logic and control unit (LCU)
100 printer
111 imaging member
112 intermediate transfer member
113 transfer backup member
201 first transfer nip
202 second transfer nip
206 photoreceptor
210 charging subsystem
211 meter
212 meter
213 grid
216 surface
220 exposure subsystem
225 development station
226 toning shell
227 magnetic core
240 power source
250 linear printhead
251 end
252 end
255 light source
260 lenslet array
265 lenslet
270 in-track direction
275 cross-track direction
280 exposure spot
285 focus adjustment mechanism
290 frame
295 heat sink
300 set initial focus position step
305 focus position
310 line image
315 print line image step
320 scan printed line image step
325 detect linewidths step
330 determine linewidth progression functions step
335 analyze linewidth progression functions step
340 defocus characteristics
345 adjust focus position step
350 in focus test
400 line
405 length direction
410 linewidth zones
410a linewidth zone
410b linewidth zone
410c linewidth zone
410d linewidth zone
410e linewidth zone
410f linewidth zone
410g linewidth zone
500 graph
505a exposure profile
505b exposure profile
508 threshold exposure
510 graph
515a line profile
515b line profile
515c line profile
520 linewidth array
525 linewidth progression function
530 graph
532 measured linewidth curve
534 smoothed linewidth curve
540 graph
550 graph
560 graph
570 graph
572 cumulative linewidth variation function
574 smoothed cumulative linewidth variation function
576 inflection point
580 graph
600 smooth linewidth progression functions step
605 remove nominal linewidth progression function step
608 determine nominal linewidth progression function step
610 nominal linewidth progression function
615 residual linewidth progression functions
620 determine linewidth variation parameters step
625 characteristic residual linewidth progression function
630 linewidth variation parameters
635 analyze linewidth variation parameters step
650 plate
652 notch
660 eccentric pin
662 axial portion
663 axial portion
664 eccentric ring
666 gripping feature
668 fiducial
670 adjustment plate
672 slot
673 slot
674 bolt
675 scale
676 fiducial
678 gripping feature
680 anti-backlash plate
682 bolt
684 fiducial
686 slot features
688 slot
690 plate
710 data processing system
720 peripheral system
730 user interface system
740 data storage system

The invention claimed is:

1. A method for adjusting a focus position of a linear printhead in a digital printing system, wherein the linear printhead includes a linear array of light sources focused onto a photosensitive medium that moves past the linear printhead in an in-track direction, comprising:
 a) providing digital image data for printing a plurality of printed lines at different cross-track positions, the printed lines extending in a length direction, wherein a linewidth of the printed lines varies along the length direction of the printed lines;
 b) printing the digital image data using the digital printing system to provide a printed line image, wherein the printing includes activating the light sources in the linear printhead in accordance with the digital image data to provide an exposure pattern on the photosensitive medium, and wherein each line is printed using a corresponding portion of the linear printhead;
 c) using a digital image capture system to capture an image of the printed line image;
 d) using a data processing system to automatically analyze the captured image to determine linewidth parameters representing linewidths of the plurality of lines in the printed line image at a plurality of positions along the length direction;

e) determining linewidth progression functions for the plurality of lines in the printed line image responsive to the determined linewidths, wherein the linewidth progression functions represent the linewidth parameters as a function of position along the length direction;

f) analyzing the linewidth progression functions to determine defocus characteristics of the linear printhead; and g) adjusting the focus position of the linear printhead responsive to the determined defocus characteristics.

2. The method of claim 1, wherein the analysis of the captured image includes extracting line profiles from the captured image corresponding to cross-sections through the lines at the plurality of positions along the length direction, and wherein the linewidth parameters are determined by analyzing the extracted line profiles.

3. The method of claim 2, wherein the analysis of the captured image further includes defining a nominal line profile, and determining scale factors that can be applied to the nominal line profile to fit the extracted line profiles, wherein the determined scale factors are used for the linewidth parameters.

4. The method of claim 1, wherein the determination of the linewidth progression functions includes determining a linewidth array corresponding to an array of linewidth parameters, each column of the linewidth array corresponding to the linewidth progression function for a different line, and each row of the linewidth array corresponding to a different position along the length direction of the lines.

5. The method of claim 4, wherein the analysis of the linewidth progression functions includes smoothing the rows of the linewidth array.

6. The method of claim 4, wherein the analysis of the linewidth progression functions includes removing a nominal linewidth progression function from each of the linewidth progression functions to determine residual linewidth progression functions, and wherein the nominal linewidth progression function is determined by performing a singular value decomposition analysis on the linewidth array.

7. The method of claim 1, wherein the analysis of the linewidth progression functions includes removing a nominal linewidth progression function to determine residual linewidth progression functions.

8. The method of claim 7, wherein the nominal linewidth progression function is determined by computing an average of a plurality of the linewidth progression functions.

9. The method of claim 7, wherein the nominal linewidth progression function is predetermined to correspond to the linewidth progression function that would be produced by a properly focused linear printhead.

10. The method of claim 7, wherein the analysis of the linewidth progression functions includes:

specifying a predefined characteristic residual linewidth progression function that is representative of the residual linewidth progression functions that result when the linear printhead is defocused;

projecting each of the residual linewidth progression functions onto the characteristic residual linewidth progression function to determine corresponding linewidth variation parameters for each of the each of the lines; and analyzing the linewidth variation parameters to determine the defocus characteristics of the linear printhead.

11. The method of claim 10, further including performing a thresholding operation on the linewidth variation parameters to set linewidth variation parameters having magnitudes smaller than a predefined threshold to zero.

12. The method of claim 10, wherein analyzing the linewidth variation parameters includes determining an estimated amount of defocus based on the magnitudes of the linewidth variation parameters, and wherein the focus position of the linear printhead is adjusted in accordance with the estimated amount of defocus.

13. The method of claim 12, wherein different estimated amounts of defocus are determined for different cross-track positions along the linear printhead, and wherein the focus position of a first end of the linear printhead is adjusted by a different amount than the focus position of a second end of the linear printhead responsive to the different estimated amounts of defocus.

14. The method of claim 10, wherein the linear printhead is positioned in an initial tilted orientation before printing the digital image data such that a first end of the linear printhead is spaced closer to the photosensitive medium than a second end of the linear printhead;

wherein analyzing the linewidth variation parameters includes determining a cross-track position where the linear printhead is properly focused by determining the cross-track position where the magnitudes of the linewidth variation parameters are minimized; and wherein adjusting the focus position of the linear printhead includes adjusting the spacing between the linear printhead and the photosensitive medium at the first and second ends of the linear printhead to match the spacing at the determined cross-track position.

15. The method of claim 1, further including repeating steps b)-f) until the determined defocus characteristics indicate that the linear printhead is in an acceptable focus position.

16. The method of claim 1, wherein the digital printing system is an electrophotographic printing system, and wherein the step of printing the digital image data includes controlling the light sources of the linear printhead to provide an exposure pattern on a photoconductor, thereby forming a corresponding charge pattern, and wherein the charge pattern is developed using charged toner particles to provide the printed line image.

17. The method of claim 1, wherein the digital image data is specified using an array of continuous tone pixels values, the pixel values varying from lighter values to darker values in the length direction, and wherein the digital image data is processed using a line screen halftone process to provide the plurality of lines, the linewidths of the lines being controlled by the pixel values of the continuous tone image.

18. The method of claim 1, wherein the light sources of the linear printhead are LED light sources.

19. The method of claim 1, wherein the digital image capture system is a digital camera system or an optical scanner system that is integrated into the digital printing system and is used to automatically capture the image of the printed line image as the printed line image travels through the digital printing system.

20. The method of claim 1, wherein the adjustment of the focus position of the linear printhead is performed by an automatic focus adjustment mechanism controlled by the data processing system.

21. The method of claim 1, wherein the adjustment of the focus position of the linear printhead is performed by a manual focus adjustment mechanism controlled by a human operator responsive to instructions presented on a user interface system.

* * * * *